(12) United States Patent
Miyauchi

(10) Patent No.: US 10,897,615 B2
(45) Date of Patent: Jan. 19, 2021

(54) IMAGE ENCODING APPARATUS AND CONTROL METHOD THEREFOR

(71) Applicant: CANON KABUSHIKI KAISHA, Tokyo (JP)

(72) Inventor: Dai Miyauchi, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 128 days.

(21) Appl. No.: 15/603,646

(22) Filed: May 24, 2017

(65) Prior Publication Data
US 2017/0353724 A1 Dec. 7, 2017

(30) Foreign Application Priority Data

Jun. 1, 2016 (JP) ................. 2016-110223

(51) Int. Cl.
*H04N 19/176* (2014.01)
*H04N 19/15* (2014.01)
*H04N 19/61* (2014.01)
*H04N 19/192* (2014.01)
*H04N 19/124* (2014.01)
*H04N 19/436* (2014.01)
*H04N 19/186* (2014.01)
(Continued)

(52) U.S. Cl.
CPC ......... *H04N 19/124* (2014.11); *H04N 19/146* (2014.11); *H04N 19/186* (2014.11); *H04N 19/436* (2014.11); *H04N 19/63* (2014.11)

(58) Field of Classification Search
CPC .. H04N 19/124; H04N 19/146; H04N 19/186; H04N 19/436; H04N 19/63; H04N 19/126; H04N 19/117; H04N 19/115; H04N 9/097; H04N 19/176; H04N 19/15; H04N 19/61; H04N 19/194
See application file for complete search history.

(56) References Cited

U.S. PATENT DOCUMENTS 6,438,167 B1* 8/2002 Shimizu ............... H04N 19/176
375/240.03
2009/0092326 A1* 4/2009 Fukuhara ............. H04N 19/139
382/233
(Continued)

FOREIGN PATENT DOCUMENTS

JP 2004-328406 A 11/2004

*Primary Examiner* — Jamie J Atala
*Assistant Examiner* — Patrick E Demosky
(74) *Attorney, Agent, or Firm* — Venable LLP

(57) ABSTRACT

An image encoding apparatus includes a plane conversion unit which generates, from image data of one frame of the moving image data, a plurality of planes each formed from a single component, a frequency conversion unit which generates a plurality of subbands for each plane by performing frequency conversion for each plane, a quantization unit which quantizes coefficients in each subband using a quantization parameter, an encoder which encodes the quantized coefficient data, and a control unit which updates the quantization parameter so that a code amount of the encoded data becomes equal to a target code amount set for each plane. The control unit updates the quantization parameter by accumulating a difference between the target code amount set for each plane and a generated code amount of each plane, and distributing the accumulated differences to the plurality of planes.

9 Claims, 12 Drawing Sheets

(51) Int. Cl.
*H04N 19/146* (2014.01)
*H04N 19/63* (2014.01)

(56) References Cited

U.S. PATENT DOCUMENTS

2010/0266047 A1* 10/2010 Takahashi ............ H04N 19/176
375/240.22
2013/0300893 A1* 11/2013 Takada ................. H04N 19/635
348/223.1

* cited by examiner

IMAGE ENCODING APPARATUS AND CONTROL METHOD THEREFOR

BACKGROUND OF THE INVENTION

Field of the Invention

The present invention relates to an encoding technique for image data.

Description of the Related Art

At present, digital apparatuses for recording moving images, such as digital video cameras, are spreading. In recent years, RAW image recording applied to only still images has been applied to moving image recording. Although a RAW image contains an enormous amount of data required for recording, it is possible to suppress correction and degradation with respect to the original image to the minimum and the degree of freedom of image editing after shooting is high. For these reasons, among users of image capturing apparatuses, advanced users like to use RAW image recording.

To record a RAW moving image in a recording medium such as a memory card, it is necessary to perform compression encoding for the RAW moving image at a certain compression ratio to enable recording for a time corresponding to the capacity of the recording medium.

In general, an image sensor adopts a Bayer arrangement. In the Bayer arrangement, different color components are alternately arranged. Thus, the correlation between adjacent pixels is low. Thus, if encoding is performed without any processing, the compression efficiency is low. Image data of the Bayer arrangement is separated into an image plane including only R components, an image plane including only G1 components, an image plane including only G2 components, and an image plane including only B components, and encoding is performed for each plane, thereby improving the encoding efficiency.

As a conventional representative compression encoding method, H.264 (H.264/MPEG-4 Part 10: Advanced Video Coding) is known. In the compression encoding method, a data amount is compressed using the temporal redundancy and spatial redundancy of a moving image for each block formed from a predetermined number of pixels in one frame.

In H.264, techniques of motion detection and motion compensation for the temporal redundancy, discrete cosine transform (DCT) as frequency conversion for the spatial redundancy, quantization, and entropy encoding are combined. However, if the compression ratio is increased to a certain ratio or more, block distortion unique to DCT becomes conspicuous, and image deterioration becomes subjectively noticeable.

To cope with this, a technique of performing decomposition into frequency bands called subbands by performing low-pass filtering and high-pass filtering in the horizontal and vertical directions is adopted as frequency conversion in JPEG 2000. In JPEG 2000, discrete wavelet transform (to be referred to as DWT hereinafter) is used to perform frequency conversion into frequency bands. Subband encoding has a feature in which block distortion is difficult to be generated and the compression characteristic at the time of compression at a high ratio is good, as compared with an encoding technique using DCT.

In addition to the above technique, code amount control for performing encoding at a desired encoding rate (compression ratio) is performed. In general code amount control, the target code amount of a frame to be encoded next is determined based on the information of a frame which has been encoded. In order to make a generated code amount converge to the target code amount of one frame, a quantization parameter Qp to be used for quantization is controlled so that the absolute value of a code amount difference (a value calculated by subtracting the target code amount from the generated code amount) becomes small. The quantization parameter is controlled for each predetermined region of the image. Note that as the value of Qp is larger, the code amount can be reduced, but Qp causes image deterioration. Thus, the quantization parameter Qp is desirably as small as possible and constant within a screen.

If the above-described plane conversion and subband encoding are combined, the input image undergoes plane conversion, and each plane undergoes DWT, thereby making it possible to perform code amount control for each subband. The target code amount of a frame is distributed to each subband as a subband target code amount, and quantization control is performed for each subband, thereby making it possible to perform quantization control and compress the image data to have a desired code amount. In addition, it is possible to improve the image quality by setting the ratio between the quantization parameters Qp of planes or subbands to have a predetermined relationship. For example, R, G (G1 and G2), and B planes generated by plane conversion are equally, visually important. From this viewpoint, these planes desirably have equal Qp. With respect to the relationship between the quantization parameters Qp of the subbands, a larger quantization parameter is desirably set for a higher-frequency subband. A relational expression for setting Qp between the subbands is also defined as implicit quantization in JPEG 2000.

However, if quantization control is individually performed for each plane or each subband, a code amount difference generated when code amount control is performed for each plane or each subband cannot be adjusted in each plane or each subband, thereby degrading the code amount controllability.

Furthermore, Qp set for each subband as an initial setting value can be set so that the quantization parameters Qp of the planes or subbands have a predetermined relationship. However, if quantization control is individually performed for each plane or each subband, the relationship between the quantization parameters Qp may deviate from the predetermined relationship by quantization control during encoding of the frame.

To solve this problem, Japanese Patent Laid-Open No. 2004-328406 describes a technique of improving the code amount controllability by defining the upper limit value of a generated code amount for each of color-difference components and a luminance component, and adding code amounts remaining in encoding of the color-difference components to the upper limit value of the generated code amount of the luminance component.

In this literature, when dividing an image into blocks while converting the image into color-difference components and a luminance component, and performing encoding for each block, encoding of the color-difference components is performed first. If code amounts remain with respect to the target code amounts assigned to the color-difference components, the upper limit value of the code amount of the luminance component is increased, thereby performing code amount control by adjusting the code amounts between the components.

However, in the technique described in this literature, the code amount controllability is improved but the image quality may degrade. For example, if the upper limit value of the code amount is replaced by the target code amount of a predetermined block, and adaptation is performed between the R, G, and B planes, control is performed to change, when the code amount of a given plane remains, only the quantization parameters Qp of the remaining planes. As a result, the relationship between the quantization parameters Qp of the planes deviates from the predetermined relationship.

In the decomposed R, G, and B planes, if the code amount of the R plane is large and the code amount of the B plane is small, code amount control is performed to set large Qp for the R plane and set small Qp for the B plane. In this case, the ratio of the information of red components to the original image after encoding decreases. Even if code amount control can be performed, the image quality resultantly degrades.

Therefore, it can be understood that, to perform encoding of high image quality, quantization control is desirably executed so that the generated code amount of a frame converges to its target code amount and the quantization parameters Qp of the planes become equal to each other.

SUMMARY OF THE INVENTION

The present invention has been made in consideration of the above problem, and provides a technique of implementing RAW moving image recording by performing code amount control while maintaining high quality without creating any imbalance between planes of color components.

According to an aspect of the invention, there is provided an image encoding apparatus for encoding moving image data captured by an image capturing unit, comprising: a plane conversion unit configured to generate, from image data of one frame of the moving image data, data of a plurality of planes each formed from a single component; a frequency conversion unit configured to generate coefficient data of a plurality of subbands for each plane by performing frequency conversion for the data of each plane; a quantization unit configured to quantize the coefficient data for each subband using a quantization parameter; an encoder configured to generate encoded data by encoding the quantized coefficient data; and a control unit configured to update the quantization parameter used by the quantization unit so that a code amount of the encoded data generated by the encoder becomes equal to a target code amount set for each plane, wherein the control unit updates the quantization parameter by accumulating a difference between the target code amount set for each plane and a generated code amount of each plane, and distributing the accumulated differences to the plurality of planes.

According to the present invention, when encoding planes of components generated from RAW moving image data, the respective planes are quantized in accordance with quantization parameters associated with each other, thereby making it possible to generate encoded data of higher image quality than before.

Further features of the present invention will become apparent from the following description of exemplary embodiments (with reference to the attached drawings).

DESCRIPTION OF THE EMBODIMENTS

Preferred embodiments of the present invention will be described below with reference to the accompanying drawings.

First Embodiment

<Apparatus Arrangement>

Figure 1:
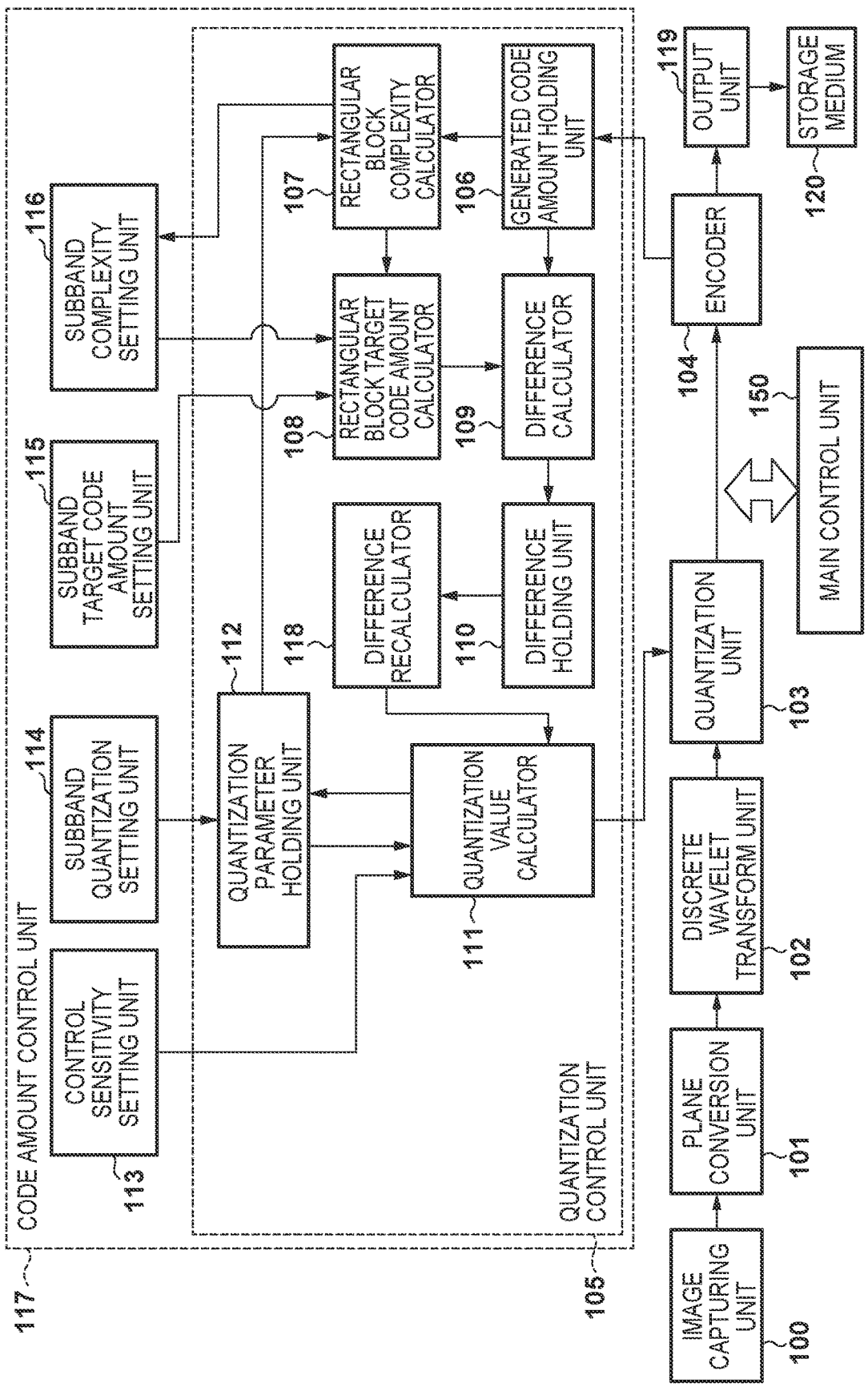
FIG. 1 is a block diagram showing the arrangement of an image encoding apparatus according to an embodiment.

FIG. 1 is a block diagram showing the arrangement of an image encoding apparatus to be applied according to the first embodiment. The image encoding apparatus is also applied to an image capturing apparatus such as a digital video camera.

Reference numeral 150 denotes a main control unit for controlling the overall apparatus, and controls various processing units to be described below.

An image capturing unit 100 accommodates an optical lens, image sensors of a Bayer arrangement, an A/D converter, and the like, and supplies captured moving image data in the RAW format to a plane conversion unit 101 on a frame basis. In the Bayer arrangement, 2×2 pixels are formed by one R (red) pixel, one B (blue) pixel, and two G (green) pixels. To discriminate between the two G pixels, they are often represented by G1 and G2. The image capturing unit 100 according to this embodiment supplies, for example, 30 RAW image data to the plane conversion unit 101 per sec.

Figure 2:
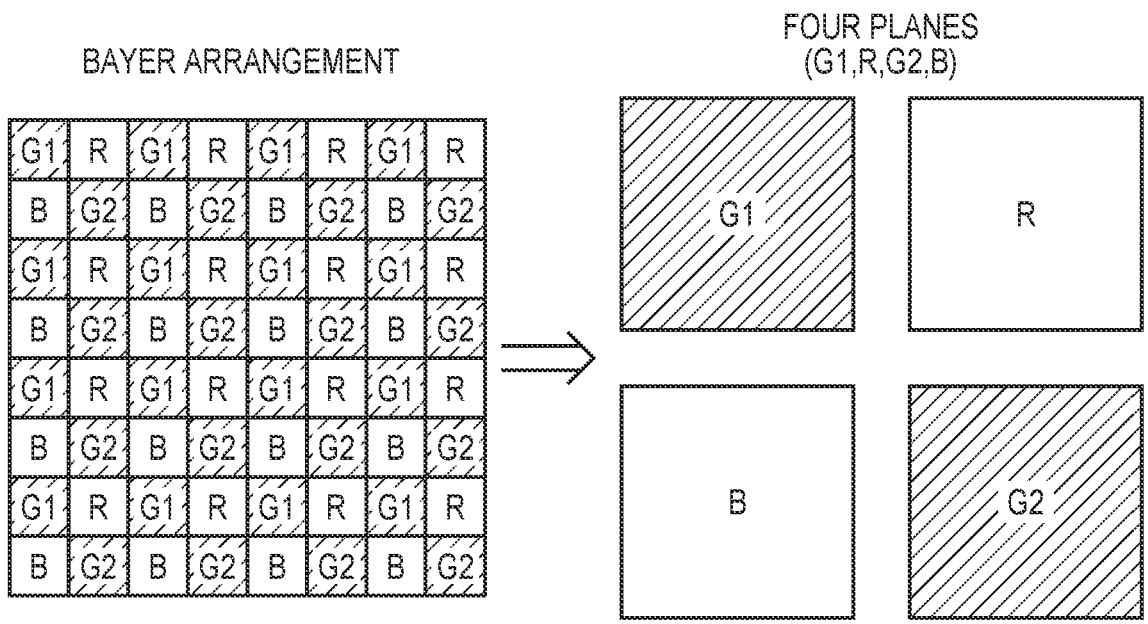
FIG. 2 is a view showing the correspondence between a Bayer arrangement and four planes of R, G1, G2, and B.

The plane conversion unit 101 generates four single-component plane data from one input RAW image data. In this embodiment, four planes of R, G1, G2, and B planes are generated, and supplied to a discrete wavelet transform unit 102. FIG. 2 shows the relationship between the input RAW image data (Bayer arrangement) and the four planes of R, G1, G2, and B. When the plane conversion unit 101 separates the data into the four planes and performs compression encoding, the correlation between pixels in each plane is increased to improve the compression efficiency, as compared with the image of the Bayer arrangement.

The discrete wavelet transform unit 102 performs discrete wavelet transform (to be referred to as DWT hereinafter) for image data indicated by the input one plane (one of the R, G1, G2, and B planes). As a result, coefficient data (frequency domain signals) of a plurality of subbands are generated, and thus the discrete wavelet transform unit 102 outputs them (to be described in detail later).

Note that the plane conversion unit 101 according to this embodiment generates four planes from one RAW image data. To shorten the time taken to perform DWT, four discrete wavelet transform units 102 may be arranged parallelly and may execute DWT parallelly. The same applies to a quantization unit 103 and an encoder 104 (both of which will be described later).

In DWT, filtering is generally performed for the entire image. However, when pixels corresponding to the number of filter taps are accumulated in a memory, filtering can be performed in the vertical and horizontal directions. Therefore, DWT is performed for each line of the input image, and is further performed recursively for a generated low-frequency subband (generally, an LL subband), thereby making it possible to parallelly process the respective subbands on a line basis.

The discrete wavelet transform unit 102 sequentially supplies, to the quantization unit 103, on a line basis, the coefficient data of the subbands of each plane obtained by frequency conversion.

A quantization control unit 105 sets, in the quantization unit 103, a quantization parameter Qp set by a code amount control unit 117 for the coefficient data input on a line basis. The code amount control unit 117 updates the quantization parameter Qp on a line basis. The quantization unit 103 quantizes each of the coefficient data forming a line of interest in accordance with the quantization parameter Qp updated on a line basis, and supplies the quantized coefficient data to the encoder 104. As the value of the quantization parameter Qp is larger, a code amount can be reduced. However, as the value of the quantization parameter Qp is larger, the image quality degrades.

The encoder 104 generates encoded data by encoding the quantized coefficient data supplied from the quantization unit 103, and supplies the generated data to an output unit 119. The output unit 119 generates encoded data in a predetermined format by adding, to the encoded data supplied from the encoder 104, a header containing information necessary for decoding, and writes the generated data in a storage medium 120.

The code amount control unit 117 according to the first embodiment will be described.

The code amount control unit 117 includes a control sensitivity setting unit 113, a subband quantization setting unit 114, a subband target code amount setting unit 115, and a subband complexity setting unit 116, and controls a code amount based on various setting values for each subband. Note that the various setting values are calculated by feedback control based on encoded information of a preceding frame.

The quantization control unit 105 controls Qp for each rectangular block preset for each subband so that a generated code amount converges to a target code amount. In this embodiment, the rectangular block corresponds to one line of the subband.

This embodiment has as its object to perform quantization control so that the quantization parameters Qp of the subbands of each plane have a predetermined Qp relationship. To do this, the quantization control unit 105 sequentially processes the lines of the respective subbands corresponding to the positions of the identical coefficient data for each of the R, G1, G2, and B planes.

A generated code amount holding unit 106 holds, for each subband, a generated code amount as encoded data sent from the encoder 104.

When a variable i represents the line number of a line to be encoded, a rectangular block complexity calculator 107 calculates a complexity $X[i-1]$ of an immediately preceding line in preparation for the ith line to be subsequently encoded in a subband of interest (to be described in detail later).

The complexities of the respective lines calculated by the rectangular block complexity calculator 107 are integrated (added) for each subband, and held in the subband complexity setting unit 116. A rectangular block target code amount calculator 108 calculates a line target code amount $T[i-1]$ of the subband of interest in accordance with a subband target code amount Tsb set by the subband target code amount setting unit 115, a subband complexity Xsb set by the subband complexity setting unit 116, and the line complexity $X[i-1]$ calculated by the rectangular block complexity calculator 107 (to be described in detail later).

A difference calculator 109 calculates, for each line of the subband of interest, a difference value $E[i-1]$ between a generated code amount $S[i-1]$ from the line of interest held in the generated code amount holding unit 106 and the line target code amount $T[i-1]$ output from the rectangular block target code amount calculator 108.

A difference holding unit 110 holds, for each subband, an integrated difference value $\Sigma E[i-1]$ obtained by integrating the calculated value $E[i-1]$. Assume that the target code amount of the subband of interest is represented by Ttarget, the number of lines included in the subband of interest is represented by M, and a coordinate space in which the horizontal axis is defined as the number of lines and the vertical axis is defined as the code amount is defined. The integrated difference value $\Sigma E[i-1]$ indicates a deviation from an ideal code amount transition line connecting the origin (0, 0) and a point (M, Ttarget).

Using the integrated difference value $\Sigma E[i-1]$ for each subband held in the difference holding unit 110, a difference recalculator 118 calculates a recalculated code amount difference value Ere to be used by a quantization value calculator 111 to determine Qp (to be described in detail later).

The quantization value calculator 111 determines a quantization parameter $Qp[i]$ of the next line in the subband of interest using the recalculated code amount difference value Ere sent from the difference recalculator 118, $Qp[0]$ as initial Qp set by the subband quantization setting unit 114 and held in a quantization parameter holding unit 112, and control sensitivity r set by the control sensitivity setting unit 113. The quantization parameter $Qp[i]$ is calculated so that a generated code amount integrated amount up to the line of interest becomes close to a target code amount integrated amount up to the line of interest (to be described in detail later). The general processing contents of the code amount control unit 117 according to this embodiment have been described.

<Discrete Wavelet Transform (DWT)>

Figure 3:
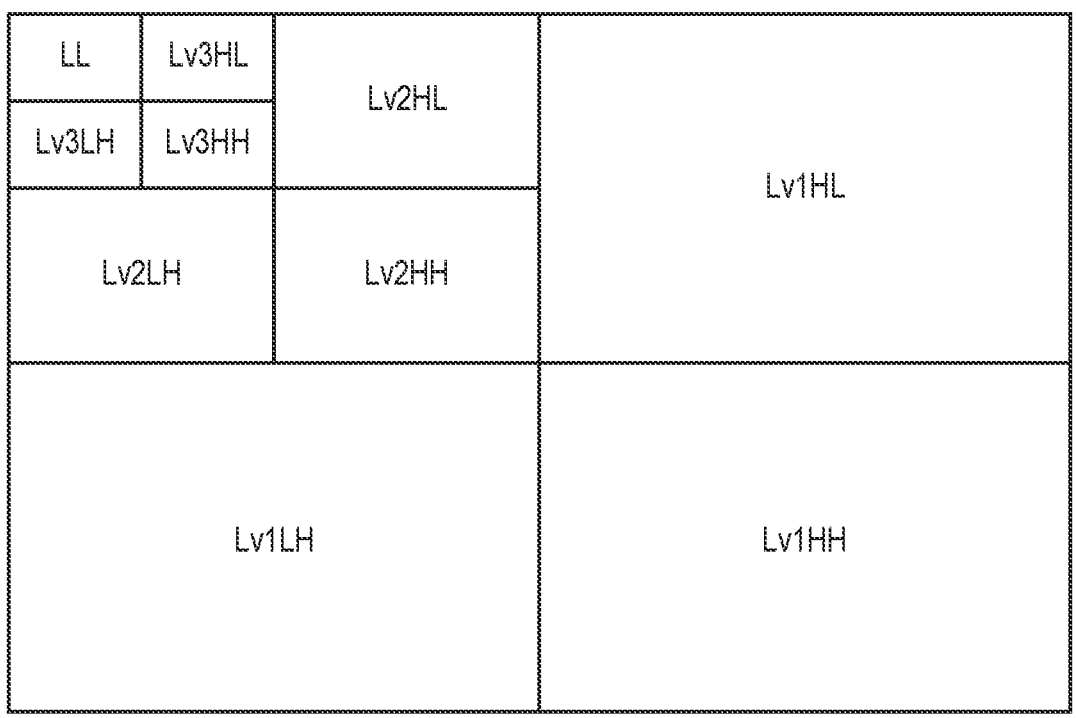
FIG. 3 is a view showing formation of subbands when discrete wavelet transform (DWT) is performed three times.

FIG. 3 is a view showing formation of subbands when each of vertical and horizontal filtering processes of DWT is performed three times, that is, in the case of decomposition level 3.

In DWT, coefficient data of four frequency bands (subbands) of HH, HL, LH, and LL are generated by performing filtering in the vertical and horizontal directions. The decomposition level is increased by recursively performing DWT for the low-frequency (LL) subband generated by the above transform, thereby increasing the granularity of frequency decomposition, as shown in FIG. 3. Note that "L" and "H" in FIG. 3 indicate low and high frequencies, respectively. With respect to the order of "L" and "H", the preceding "L" or "H" indicates a band as a result of performing horizontal filtering and the succeeding "L" or "H" indicates a band as a result of performing vertical filtering. A number after "Lv" indicates the decomposition level of DWT. Furthermore, LL indicates the lowest-frequency subband.

The code amount control unit 117 shown in FIG. 1 performs code amount control by setting a larger quantization parameter for a higher-frequency subband, and setting a smaller quantization parameter for a lower-frequency subband. This compresses the generated code amount for higher-frequency components of image data which are difficult to visually perceive in terms of the human visual characteristic, thereby improving the encoding efficiency.

<Calculation of Complexity>

The complexity is an index representing the difficulty of encoding of an image. The complexity is larger as the image is more difficult, and is smaller as the image is easier. The difficult image indicates that a generated code amount is large when encoding the entire image by given Qp. Therefore, using the quantization parameter Qp and the generated code amount S, a complexity X is given by:

$$X = Qp \times S \quad (1)$$

To calculate a rectangular block target code amount, the rectangular block complexity calculator 107 calculates the complexity X of a line immediately before the line of interest to be encoded next.

When the quantization parameter used for encoding of the immediately preceding line is represented by $Qp[i-1]$ and the generated code amount at this time is represented by $S[i-1]$, in accordance with equation (1), the complexity $X[i-1]$ of the immediately preceding line is given by:

$$X[i-1] = Qp[i-1] \times S[i-1] \quad (2)$$

<Calculation of Rectangular Block Target Code Amount>

In each subband, a variation of Qp can be made as small as possible in the subband by assigning a larger target code amount to a more difficult line of an image and a smaller target code amount to an easier line.

In accordance with the subband target code amount Tsb set by the subband target code amount setting unit 115, the subband complexity Xsb set by the subband complexity setting unit 116, and the rectangular block complexity $X[i-1]$, the rectangular block target code amount calculator 108 calculates the target code amount $T[i-1]$ of the line to be encoded next in the subband of interest by:

$$T[i-1] = Tsb \times X[i-1]/Xsb\_\{N-1\} \quad (3)$$

Since, as indicated by equation (1), the complexity is calculated using the generated code amount, it is a feedback amount which cannot be obtained unless encoding is performed. Therefore, as for Xsb, the subband complexity $Xsb\_\{N-1\}$ of the immediately preceding frame is fed back and used for the Nth frame as the frame of interest. Note that N is an integer, and the Nth frame represents RAW image data of interest.

By multiplying Tsb by the ratio of the complexity of the line of interest to that of the entire subband, as given by equation (3), it is possible to assign a large target code amount to a difficult line and a small target code amount to an easy line. As a result, the variation of Qp in the subband can be made as small as possible.

<Quantization Control>

There is provided a known technique described in "MPEG 2 Test Model 5" as a quantization parameter calculation method. According to this technique, using the integrated difference value $\Sigma E[i-1]$ held in the difference holding unit 110, the initial quantization parameter $Qp[0]$ held in the quantization parameter holding unit 112, and the control sensitivity r set by the control sensitivity setting unit 113, the quantization parameter $Qp[i]$ of the next line in the subband of interest can be calculated by:

$$Qp[i] = Qp[0] + r \times \Sigma E[i-1] \quad (4)$$

Note that as the control sensitivity r is larger, it improves the code amount controllability while abruptly changing Qp[i] in accordance with the recalculated code amount difference value.

In the first embodiment, control for satisfying the predetermined Qp relationship (to be described later) is performed by executing calculation using the recalculated code amount difference value Ere sent from the difference recalculator 118 instead of the integrated difference value $\Sigma E[i-1]$, as given by:

$$Qp[i] = Qp[0] + r \times Ere \quad (5)$$

By using "MPEG 2 Test Model 5", it is possible to perform code amount control by setting a large quantization parameter if the generated code amount is larger than the target code amount and setting a small quantization parameter if the generated code amount is smaller than the target code amount.

<Code Amount Control: Predetermined Relationship Between Quantization Parameters of RGB Planes>

The respective planes generated by conversion into the R, G1, G2, and B planes shown in FIG. 2 are equally important in terms of the human visual characteristic, and can be considered to be equal and uniformly important. Note that in the G1 and G2 planes, encoding is performed using the same quantization parameter, and the G1 plane will be simply referred to as the G plane hereinafter.

As already described above, it is desirable that the quantization parameters Qp of all the planes are equal to each other. The desired relationship between the quantization parameters Qp of the planes or subbands will be referred to as the predetermined Qp relationship.

A problem imposed when performing quantization control by using the integrated difference value of each subband without any change will now be described.

Figure 4A:
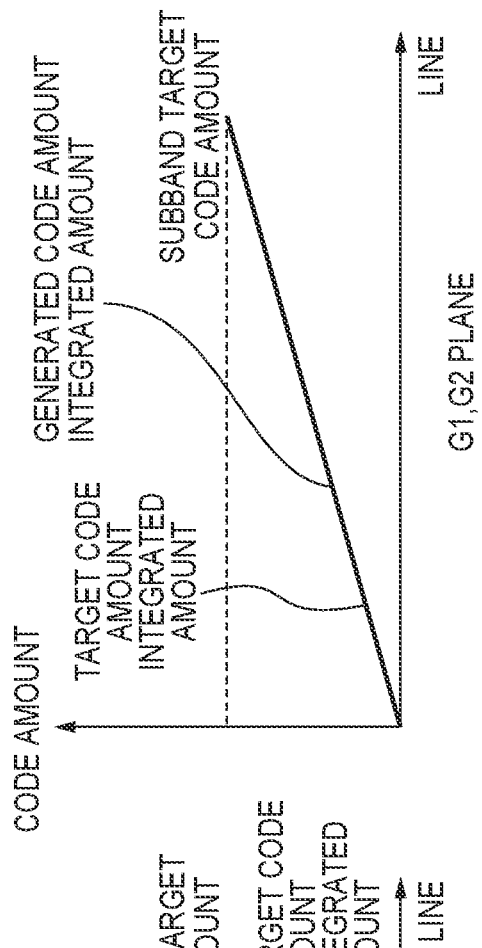
FIGS. 4A to 4D are graphs respectively showing examples of transitions of code amounts of respective planes and transitions of quantization parameters according to a conventional technique.
Figure 4B:
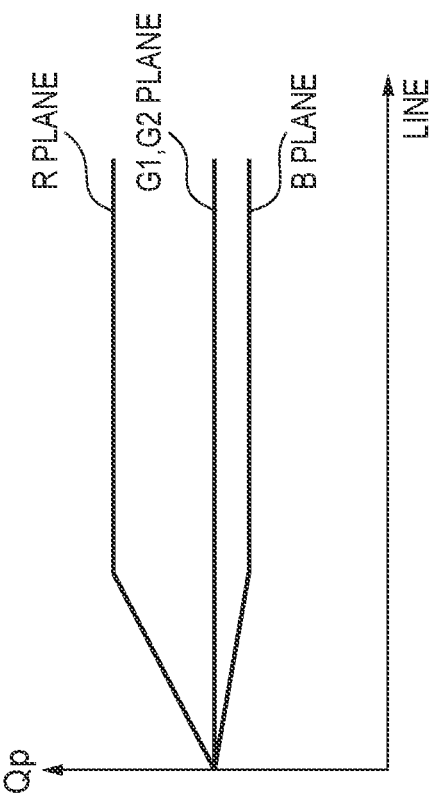
Figure 4C:
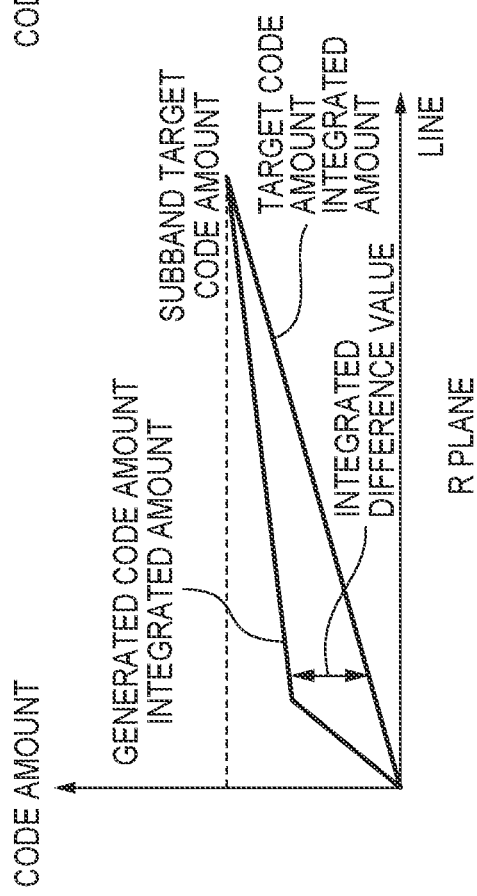
Figure 4D:
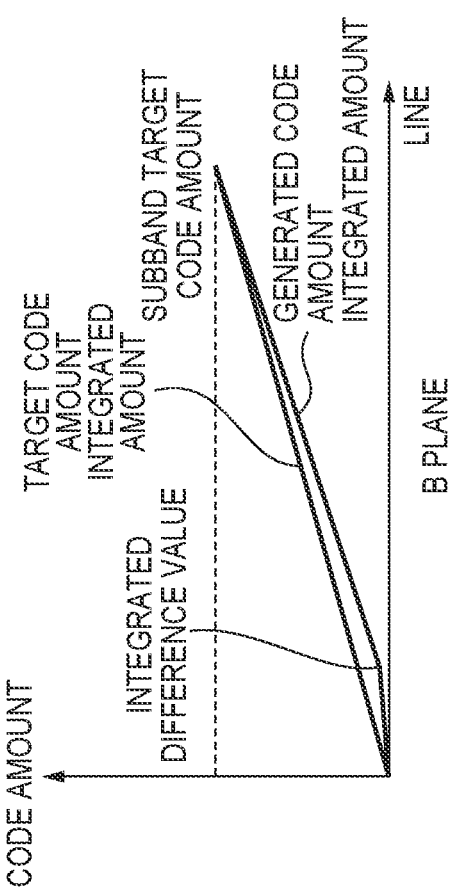

FIGS. 4A to 4C are graphs showing an example of conventional quantization control when in a given subband of interest, the generated code amount is larger than the target code amount in the R plane, the generated code amount transits on the target code amount in the G1 and G2 planes, and the generated code amount is smaller than the target code amount in the B plane. FIG. 4D is a graph showing transition of Qp in the subband of interest of each of the planes in FIGS. 4A to 4C.

In conventional quantization control, quantization control is individually performed for each subband of each plane. This indicates an operation when a recalculated code amount difference value to be recalculated for each color plane by a conventional difference recalculator is given by $Ere = \Sigma E[i-1]$.

The subband target code amount is a value predicted using feedback control or the like, and is not always a correct setting value. Note that correct setting indicates setting in which no integrated difference value is generated and Qp remains unchanged from initial Qp through all the lines.

If the line generated code amount integrated amount of the subband of interest is larger than the target code amount integrated amount of each line as in the R plane shown in FIG. 4A, quantization control works to suppress the generated code amount by increasing Qp. On the other hand, if the line generated code amount integrated amount of the subband of interest is smaller than the target code amount integrated amount of each line, quantization control works to increase the generated code amount by decreasing Qp. Consequently, Qp varies between the planes, and the relationship may deviate from the "predetermined Qp relationship". In this case, although the code amount converges to the preset frame target code amount, Qp varies between the planes, and the image quality largely degrades, as compared with a case in which control is performed to keep the "predetermined Qp relationship".

In this embodiment, the difference recalculator 118 calculates the recalculated code amount difference value to be used by the quantization value calculator 111 in equation (5) so that the quantization parameters Qp of the planes have the "predetermined Qp relationship".

In this embodiment, the recalculated code amount difference value is calculated to be the same in all the planes.

In the following description, respective parameters of the planes, decomposition levels, and subbands are described using "plane", "lv", and "subband". Note that in this embodiment, "plane" indicates one of R, G1, G2, and B, "lv" indicates one of Lv1, Lv2, and Lv3, and "subband" indicates one of HL, LH, and HH.

Using "plane", "lv", and "subband", the above-described recalculated code amount difference value Ere of each subband is redefined as Ere[plane][lv][subband], and the integrated difference value ΣE[i−1] of each subband is redefined as ΣE[plane][lv][subband][i−1].

Furthermore, a plane of interest is represented by plane_cur, a level of interest is represented by lv_cur, and a subband of interest is represented by subband_cur. A subband-of-interest total difference amount Esbtotal[lv_cur][subband_cur][i−1] (to be described later) is a value generated by adding ΣE[plane][lv_cur][subband_cur][i−1] for all the planes, and has a value of 0 as an initial value at start of encoding of a RAW image of interest (a frame of interest).

Figure 5:
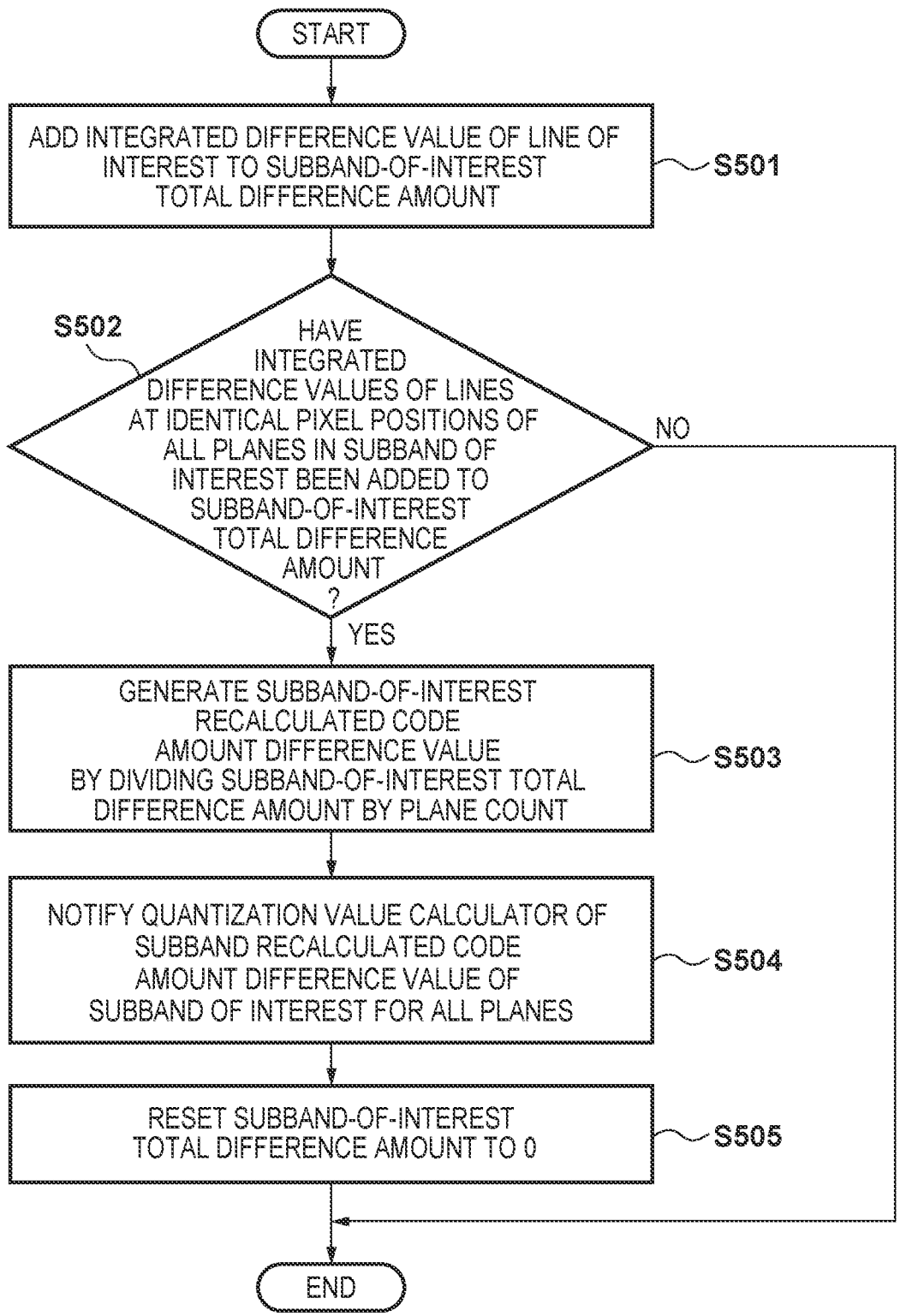
FIG. 5 is a flowchart illustrating the processing of a difference recalculator according to the first embodiment.

FIG. 5 is a flowchart illustrating the processing procedure of the difference recalculator 118. The processing of the difference recalculator 118 according to this embodiment will be described below with reference to FIG. 5. The following description assumes that the encoder 104 parallelly encodes the quantization coefficient data of the identical lines of the four planes in the same subband. Note that the quantization coefficient data need not always be encoded parallelly, and need only be encoded substantially simultaneously. The following description also assumes that various values and amounts are held in the register (or memory) of the difference recalculator 118.

In step S501, the difference recalculator 118 adds the integrated difference value of the line of interest to the subband-of-interest total difference amount. If it is determined in step S502 that the integrated difference values of the lines at the identical pixel positions of all the planes in the subband of interest have been added to the subband-of-interest total difference amount, the difference recalculator 118 advances to step S503; otherwise, the process ends.

In step S503, the difference recalculator 118 generates a subband recalculated code amount difference value Ere[plane][lv_cur][subband_cur] of each plane by dividing the subband-of-interest total difference amount by a plane count "4". In step S504, the difference recalculator 118 notifies the quantization value calculator 111 of the subband recalculated code amount difference value of the subband of interest for all the planes. In step S505, the subband-of-interest total difference amount is reset to 0 in preparation for encoding of the subband of interest of the next frame.

Referring to FIG. 5, the recalculated code amount difference value Ere[plane][lv_cur][subband_cur] of each plane is calculated by equation (7) below.

$$Esbtotal\ [lv\_cur]\ [subband\_cur][i-1] = \qquad (6)$$
$$\Sigma E[R]\ [lv\_cur]\ [subband\_cur][i-1] +$$
$$\Sigma E[G1]\ [lv\_cur]\ [subband\_cur][i-1] +$$
$$\Sigma E[G2]\ [lv\_cur]\ [subband\_cur][i-1] +$$
$$\Sigma E[B]\ [lv\_cur]\ [subband\_cur][i-1]$$

$$Ere\ [plane]\ [lv\_cur]\ [subband\_cur] = \qquad (7)$$
$$Esbtotal\ [lv\_cur]\ [subband\_cur]\ [i-1]/4$$

With the above processing, the recalculated code amount difference value used by the quantization value calculator 111 is common to all the planes in the subband of interest.

Figure 6:
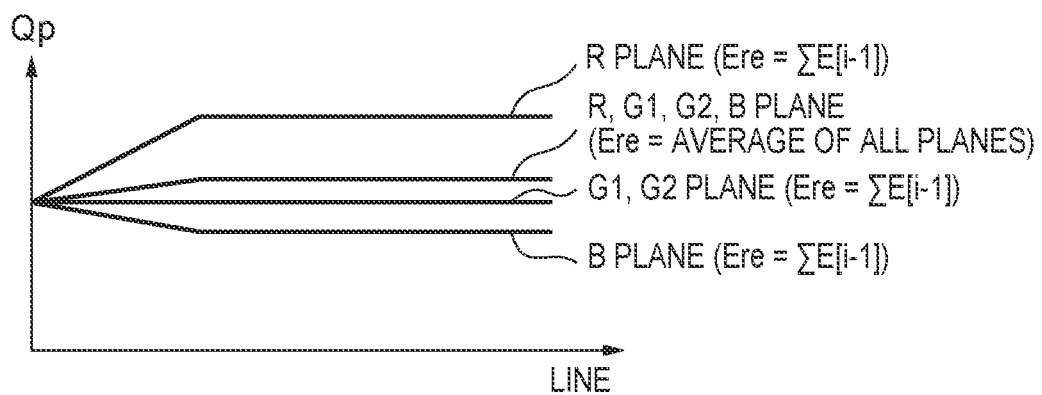
FIG. 6 is a graph showing comparison between transition of quantization control according to the first embodiment and conventional transition.

FIG. 6 is a graph showing an example of transition of Qp in the subband of interest in each plane in quantization control according to this embodiment. Note that for the sake of descriptive convenience, FIG. 6 shows a case in which the generated code amount is larger than the target code amount in the R plane, the generated code amount transits on the target code amount in the G1 and G2 planes, and the generated code amount is smaller than the target code amount in the B plane, similarly to FIGS. 4A to 4C.

As described with reference to FIGS. 4A to 4D, if quantization control is performed while keeping Ere[plane_cur][lv_cur][subband_cur]=ΣE[plane_cur][lv_cur][subband_cur][i−1], the relationship between the quantization parameters Qp of the planes may deviate from the predetermined Qp relationship.

To the contrary, in quantization processing applied in the embodiment, recalculated code amount difference values are calculated from the subband of interest of all the planes. Thus, if initial Qp is commonly set for all the planes based on equation (4), Qp is the same in all the planes, as shown in FIG. 6. Therefore, code amount control can be performed while satisfying the predetermined Qp relationship.

In the subband of interest, since the integrated difference value of each plane is added as a subband code amount difference value for each line, and code amount control is performed so that the absolute value of the subband code amount difference value becomes small, the accuracy of the code amount controllability never degrades.

Figure 13:
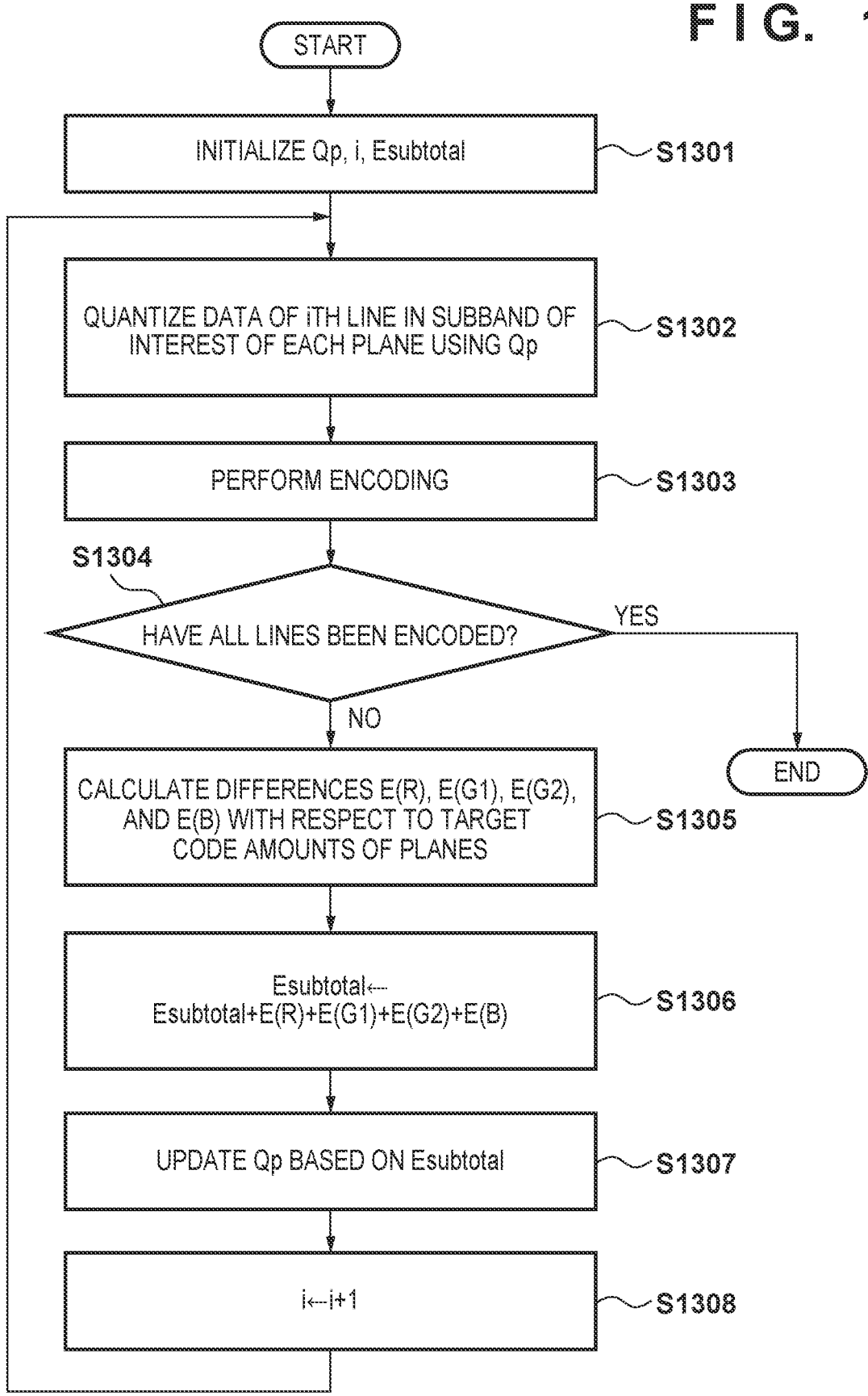
FIG. 13 is a flowchart illustrating a processing procedure of quantization and encoding for one subband according to the first embodiment.

The overall processing related to encoding of the apparatus according to the embodiment will be described with reference to a flowchart shown in FIG. 13. FIG. 13 shows the processing contents of the main control unit 150 shown in FIG. 1, and processing for a certain subband of a certain decomposition level. Therefore, it is understood that the processing shown in FIG. 1 is executed for all the subbands (except for the LL subband) of all the decomposition levels (all resolutions). Note that no quantization control may be performed for a subband whose decomposition level advances to some extent. Assume that prior to this processing, conversion of image data of one frame forming a RAW moving image into R, G1, G2, and B planes and DWT processing for each plane are complete. For the sake of descriptive simplicity, the coefficient data of the ith line of the subband of interest of each plane will be simply referred to as the coefficient data of the ith line of each plane hereinafter.

In step S1301, the main control unit 150 sets the quantization parameter Qp (common to the planes) to the initial value prior to processing of the subband of interest of each plane. The main control unit 150 also clears the variable i for specifying the line of interest and a subband total difference amount Esubtotal to 0.

In step S1302, the main control unit 150 supplies the data of the ith line of each plane to the quantization unit 103 to perform quantization. The quantization unit 103 quantizes the supplied data of the ith line of each plane in accordance with the quantization parameter Qp.

In step S1303, the main control unit 150 controls the encoder 104 to encode the quantized coefficient data of the ith line of each plane after quantization. As a result, encoded data of the ith line of each plane is generated. However, the generated encoded data is temporarily accumulated in the output unit 119. After encoded data of a certain amount is accumulated and encoded data in a preset data format is formed, the output unit 119 writes the data in the storage medium 120. The encoder 104 supplies information indicating the amount of the generated encoded data of the ith line of each plane to the generated code amount holding unit 106.

In step S1304, the main control unit 150 determines whether encoding for the subband of interest is complete. If it is determined that encoding is complete, the main control unit 150 ends the processing shown in FIG. 13, and shifts to processing for the next subband or processing for the next frame.

If it is determined that encoding for the subband of interest is incomplete, the main control unit 150 controls, in step S1305, the quantization control unit 105 to obtain a difference E(R), E(G1), E(G2), or E(B) between the line target code amount set for each plane and the encoded data amount of the ith line which has actually been generated in each plane.

In step S1306, the main control unit 150 controls the quantization control unit 105 to accumulate E(R), E(G1), E(G2), and E(B) in the subband total difference amount Esubtotal. That is, a deviation value, generated from the first line to the ith line of the subband of interest, from the target code amount is calculated.

In step S1307, the main control unit 150 calculates the subband recalculated code amount difference value Ere in accordance with equation (7), and updates the quantization parameter Qp common to the planes in accordance with equation (5). In step S1308, the main control unit 150 increases the variable i by "1", and returns the process to step S1302.

As described above, it is possible to suppress degradation of the image quality by summarizing, for each subband, code amount differences for the planes, equally redistributing the code amount differences to the planes so that Qp becomes the same in the planes, and performing quantization control using the redistributed code amount differences.

Note that without performing DWT, each plane obtained by plane conversion may be considered as a frequency band and set as the summarizing unit of the integrated difference values, and the code amount difference values may be redistributed to the planes. With respect to DWT, the number of decomposition (execution) operations is not limited, and may be, for example, four or more. Furthermore, in this embodiment, quantization control is performed for each line.

The present invention, however, is not limited to this. Quantization control may be performed for each rectangular block having a size of 1 pixel×1 pixel or a larger size. In this embodiment, the recalculated code amount difference values are equally distributed to the planes to redistribute the code amount difference values at a relationship of 1:1. A case in which the code amount difference values are distributed not accurately at 1:1 but at a ratio which can be approximated to 1:1 is incorporated in this embodiment.

Second Embodiment

The second embodiment of the present invention will be described below. The second embodiment will be described with reference to FIG. 1, similarly to the above first embodiment. The second embodiment is different from the first embodiment in that recalculated code amount difference values to be redistributed to planes are not equal to each other.

<Code Amount Control>

Referring to FIG. 1, a plane conversion unit 101 may separate image data of a Bayer arrangement into a plurality of planes including a luminance plane and color-difference planes.

A luminance component of an image is visually important more than color-difference components of the image in terms of the human visual characteristic. Thus, it is common practice to improve the image quality by decreasing Qp for the luminance component. Therefore, when encoding the plurality of planes formed from the luminance and color-differences, Qp is set small for the luminance plane and is set large for the color-difference planes.

A difference recalculator 118 according to the second embodiment recalculates, as recalculated code amount difference values, code amount difference values to be used by a quantization value calculator 111, so that the quantization parameters Qp of the planes have a predetermined Qp relationship. Unlike the first embodiment, the recalculated code amount difference values to be redistributed to the planes are set larger for the color-difference planes than for the luminance plane.

Figure 7:
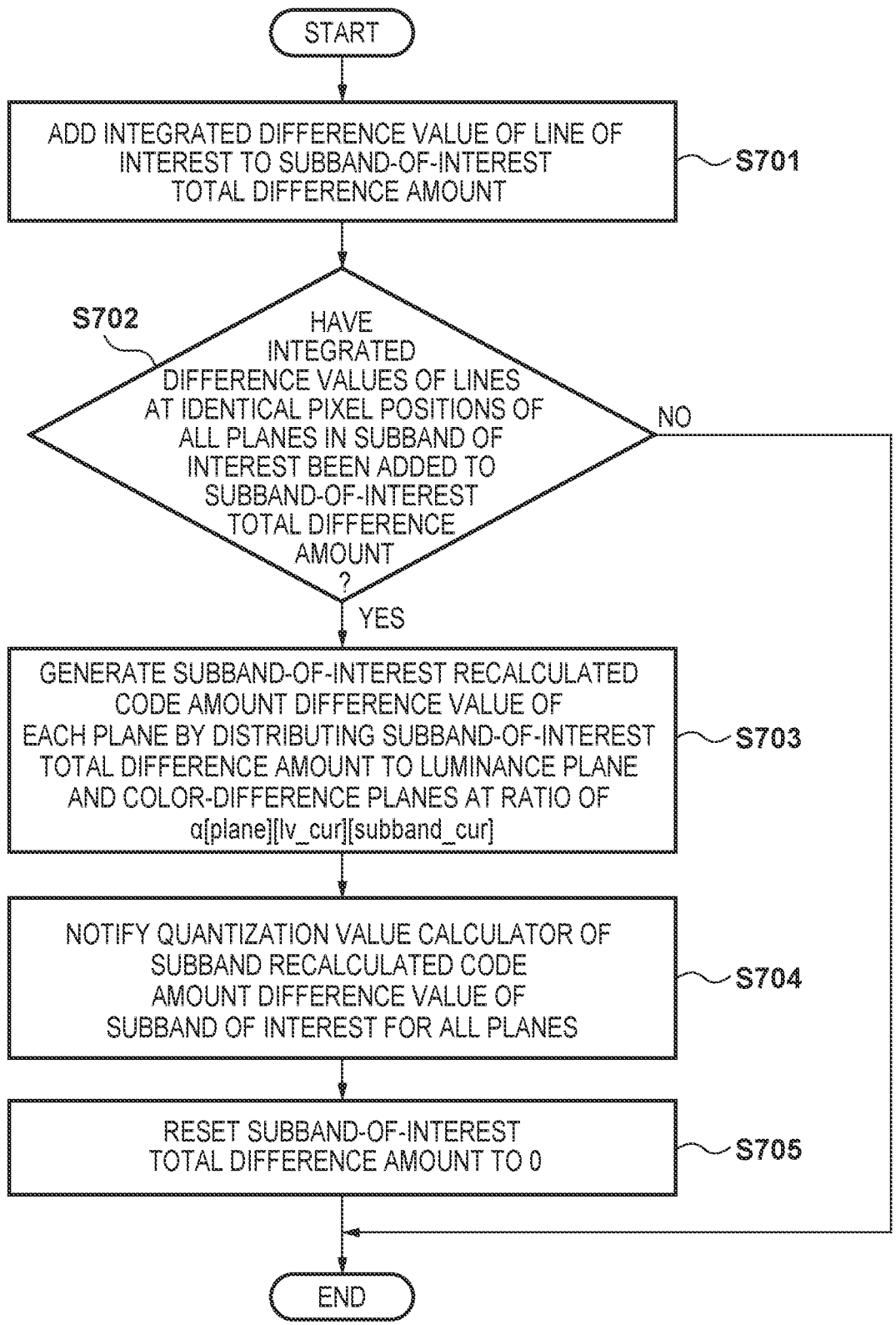
FIG. 7 is a flowchart illustrating the processing of a difference recalculator according to the second embodiment.

FIG. 7 is a flowchart illustrating the processing procedure of the difference recalculator 118 according to the second embodiment. Note that in the second embodiment, the plane conversion unit 101 generates four planes formed from a luminance Y and color-differences C1, C2, and C3, and "plane" indicates one of Y, C1, C2, and C3. Note that in fact, three planes such as Y, U, and V planes or Y, Cb, and Cr planes may be adopted as luminance and color-difference planes, and the type of color space and the number of planes are not specifically limited.

The processing of the difference recalculator 118 according to the second embodiment will be described with reference to FIG. 7.

In step S701, the difference recalculator 118 adds the integrated difference value of a line of interest to a subband-of-interest total difference amount. If it is determined in step S702 that the integrated difference values of the lines at the identical pixel positions of all the planes in the subband of interest have been added to the subband-of-interest total difference amount, the difference recalculator 118 advances to step S703; otherwise, the process ends.

In step S703, the difference recalculator 118 generates the subband recalculated code amount difference value of each plane so as to distribute the subband-of-interest total difference amount to the luminance plane and color-difference planes at a ratio of α[Y][lv_cur][subband_cur]: α[C1][lv_cur][subband_cur]: α[C2][lv_cur][subband_cur]: α[C3][lv_cur][subband_cur].

Note that α[plane][lv_cur][subband_cur] represents the ratio of Ere[plane][lv_cur][subband_cur] to be assigned to each plane. If the subband-of-interest total difference amount is positive, α[Y][lv_cur][subband_cur]<α[C1][lv_cur][subband_cur]=α[C2][lv_cur][subband_cur]=α[C3][lv_cur][subband_cur] holds. On the other hand, if the subband-of-interest total difference amount is negative, α[Y][lv_cur][subband_cur]>α[C1][lv_cur][subband_cur]= α[C2][lv_cur][subband_cur]=α[C3][lv_cur][subband_cur] holds.

By distributing the subband total difference amount, as described above, the subband recalculated code amount difference value to be assigned to the luminance plane can be made smaller than those to be assigned to the color-difference planes.

In step S704, the difference recalculator 118 sends the subband recalculated code amount difference values of all the planes in the subband of interest. In step S705, the subband total difference amount is reset to 0.

With the processing of FIG. 7, Ere[plane][lv_cur][subband_cur] of each plane is calculated by equation (9) below.

$$Esbtotal\,[lv\_cur]\,[subband\_cur][i-1] = \quad (8)$$
$$\Sigma E[Y]\,[lv\_cur]\,[subband\_cur][i-1] +$$
$$\Sigma E[C1]\,[lv\_cur]\,[subband\_cur][i-1] +$$
$$\Sigma E[C2]\,[lv\_cur]\,[subband\_cur][i-1] +$$
$$\Sigma E[C3]\,[lv\_cur]\,[subband\_cur][i-1]$$

$$Ere\,[plane]\,[lv\_cur]\,[subband\_cur] = \quad (9)$$
$$Esbtotal\,[lv\_cur]\,[subband\_cur]\,[i-1] \times$$
$$\alpha\,[plane]\,[lv\_cur]\,[subband\_cur]/\beta$$

where β represents a parameter for normalizing Ere[plane][lv_cur][subband_cur] so that Esbtotal[lv_cur][subband_cur][i−1] is properly distributed, which is determined by each α[plane][lv_cur][subband_cur].

With the above processing, the recalculated code amount difference values to be used by the quantization value calculator 111 are distributed so that the recalculated code amount difference values for the color-difference planes are larger than that for the luminance plane. As a result, the quantization parameter of the luminance plane is generally maintained smaller than those of the color-difference planes.

If initial Qp is set to satisfy the above-described predetermined Qp relationship between the quantization parameters of the luminance and color-difference planes, even if quantization control is executed based on equation (4), it is possible to perform code amount control while the quantization parameters Qp of the lines satisfy the predetermined Qp relationship.

As described above, code amount differences for the planes are summarized for each subband, and the code amount differences are redistributed to the planes at the same ratio as the predetermined Qp relationship so that the quantization parameters Qp of the respective planes have the predetermined Qp relationship, thereby performing quantization control using the redistributed code amount differences. As a result, it is possible to perform encoding while suppressing degradation of the image quality.

Third Embodiment

The third embodiment will be described below. An example of an arrangement according to the third embodiment will be explained as the arrangement shown in FIG. 1, similarly to the second embodiment.

The third embodiment is different from the second embodiment in that no recalculated code amount difference value is distributed to a predetermined plane.

In the third embodiment, a subband quantization setting unit 114 can also set maxQp as an arbitrary value for each subband of each plane. Note that maxQp represents the clip value (upper limit value) of a quantization parameter of which a quantization unit 103 is notified from a quantization value calculator 111. If the right-hand side of equation (4) is larger than maxQp, the quantization value calculator 111 operates to clip the left-hand side to maxQp.

<Code Amount Control>

As already described in the second embodiment, it is desirable to set Qp of the luminance plane to a value smaller than those of the color-difference planes in encoding of the plurality of planes including the luminance and color-difference planes. In the third embodiment, the information amount of the luminance plane which is visually important is protected by distributing the code amount difference values to only the color-difference planes without assigning the code amount difference value to the luminance plane.

Figure 8:
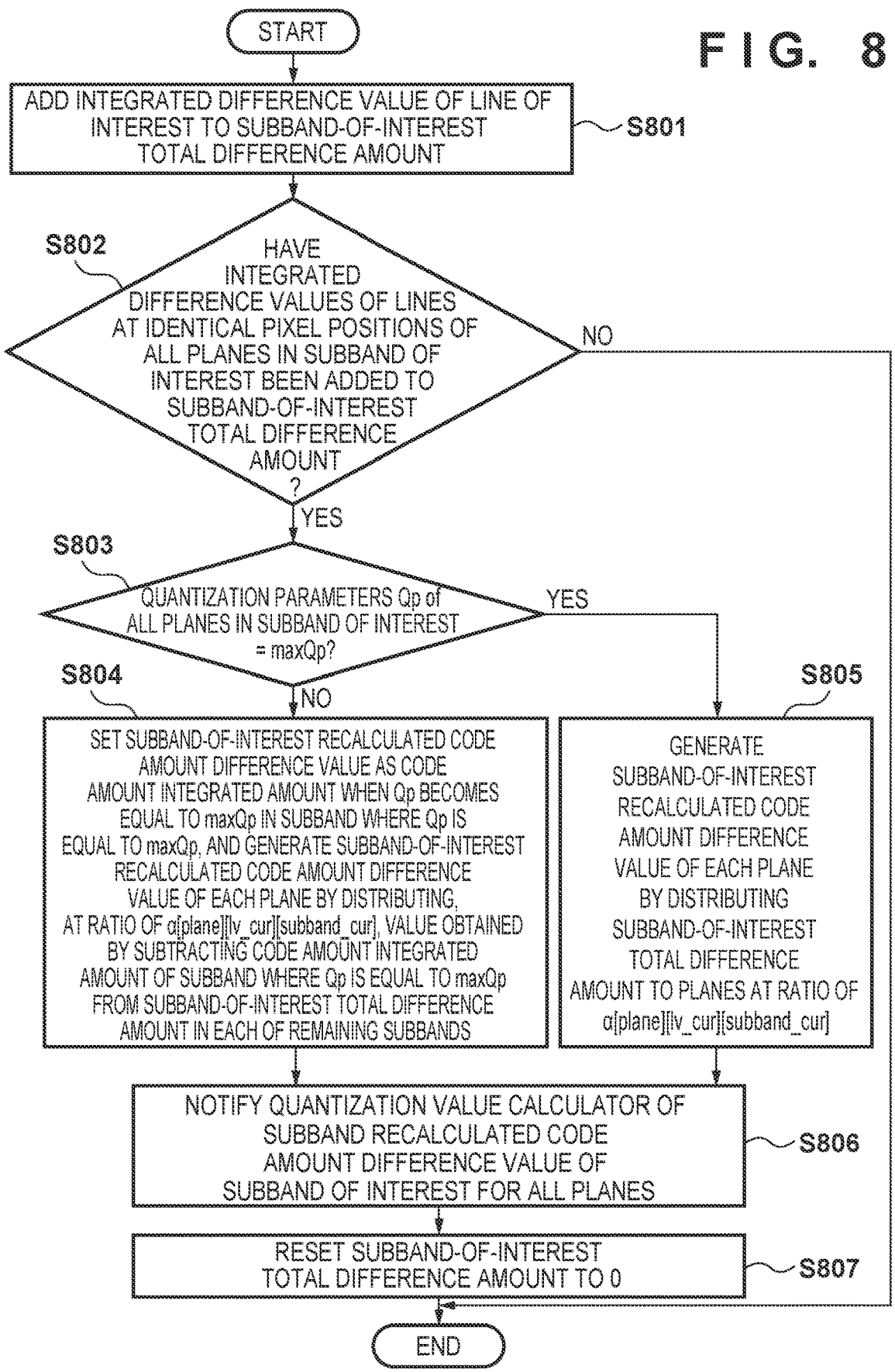
FIG. 8 is a flowchart illustrating the processing of a difference recalculator according to the third embodiment.

FIG. 8 is a flowchart illustrating the processing procedure of a difference recalculator 118 according to the third embodiment. The processing of the difference recalculator 118 according to the third embodiment will be described below with reference to FIG. 8. The third embodiment assumes that a plane conversion unit 101 generates four planes formed from a luminance Y and color-differences C1, C2, and C3.

In step S801, the difference recalculator 118 adds the integrated difference value of a line of interest to a subband-of-interest total difference amount. In step S802, the difference recalculator 118 determines whether the integrated difference values of the lines at the identical pixel positions of all the planes in the subband of interest have been added to the subband-of-interest total difference amount. If it is determined that the integrated difference values have been added, the process advances to step S803; otherwise, the process ends.

If the difference recalculator 118 determines in step S803 that the quantization parameters Qp of all the planes in the subband of interest are equal to maxQp, the process advances to step S805; otherwise, the process advances to step S804.

In step S804, in the subband where Qp is equal to maxQp, the difference recalculator 118 sets a subband-of-interest recalculated code amount difference value as a code amount integrated amount when Qp becomes equal to maxQp. In each of the remaining subbands of the planes, the difference recalculator 118 generates the subband-of-interest recalculated code amount difference value of each plane by distributing, at a ratio of α[Y][lv_cur][subband_cur]: α[C1][lv_cur][subband_cur]: α[C2][lv_cur][subband_cur]: α[C3][lv_cur][subband_cur], a value obtained by subtracting the code amount integrated amount of the subband where Qp is equal to maxQp from the subband-of-interest total difference amount.

In the third embodiment, maxQp of the luminance plane is set to a value equal to initial Qp. As a result, no recalculated code amount difference value is distributed to the luminance plane.

In step S805, the difference recalculator 118 generates the subband-of-interest recalculated code amount difference value of each plane by distributing the subband-of-interest recalculated code amount difference values to the planes in the subband of interest at a ratio of α[Y][lv_cur][subband_cur]: α[C1][lv_cur][subband_cur]: α[C2][lv_cur][subband_cur]: α[C3][lv_cur][subband_cur].

In step S806, the difference recalculator 118 notifies the quantization value calculator 111 of the subband recalculated code amount difference value of the subband of interest for all the planes. In step S807, the difference recalculator 118 resets the subband-of-interest total difference amount to 0.

With the processing of FIG. 8, if the quantization parameters Qp of all the planes do not reach maxQp or reach maxQp, Ere[plane][lv_cur][subband_cur] is calculated by equation (9) above; otherwise, Ere[plane][lv_cur][subband_cur] is calculated by equations (11) and (12) below.

Note that Ere[plane][lv_cur][subband_cur] (maxQp) represents Ere[plane][lv_cur][subband_cur] when Qp becomes equal to maxQp in the plane of interest.

$$Esbtotal\ [lv\_cur][subband\_cur][i-1] = \qquad (10)$$
$$\Sigma E[Y]\ [lv\_cur]\ [subband\_cur][i-1] +$$
$$\Sigma E[C1]\ [lv\_cur]\ [subband\_cur][i-1] +$$
$$\Sigma E[C2]\ [lv\_cur]\ [subband\_cur][i-1] +$$
$$\Sigma E[C3]\ [lv\_cur]\ [subband\_cur][i-1]$$

$$Ere\ [plane]\ [lv\_cur]\ [subband\_cur] = \qquad (11)$$
$$Ere\ [plane]\ [lv\_cur]\ [subband\_cur]$$
$$(maxQp)\ (\text{a plane where } maxQp \text{ is reached})$$

$$Ere\ [plane]\ [lv\_cur]\ [subband\_cur] = \qquad (12)$$
$$(Esbtotal\ [lv\_cur]\ [subband\_cur]\ [i-1] -$$
$$Ere\ [plane]\ [lv\_cur]\ [subband\_cur]\ (maxQp)) \times$$
$$\alpha\ [plane]\ [lv\_cur]\ [subband\_cur]/\beta$$
$$(\text{a plane where } maxQp \text{ is not reached})$$

With the above processing, the recalculated code amount difference values to be used by the quantization value calculator 111, which are applied to the color-difference planes, are larger than that applied to the luminance plane.

As described above, although the luminance is preferentially processed, if the code amounts of the color-differences are too small, a colorless image is generated, thereby causing degradation of the image quality. To cope with this, it is possible to prevent the code amounts of the color-differences from becoming too small by assigning the code amount difference value to the luminance when Qp of the color-difference plane reaches maxQp of the color-difference plane in a predetermined subband. If, in each of all the subbands, Qp reaches preset maxQp of the subband, the code amount difference values are reassigned to all the planes, thereby making it possible to ensure the code amount controllability.

As described above, code amount differences for the planes are summarized for each subband, and the recalculated code amount difference values of the planes are adjusted using maxQP so that the quantization parameters Qp of the planes have the predetermined Qp relationship, thereby performing quantization control using the redistributed code amount differences. As a result, it is possible to perform encoding while suppressing degradation of the image quality.

Note that the value of maxQp is not limited. For example, a case in which maxQp of the luminance plane is set to a value equal to maxQp of the color-difference planes is incorporated in this embodiment.

Fourth Embodiment

The fourth embodiment will be described below. An apparatus arrangement according to the fourth embodiment is the same as that shown in FIG. 1 of the first embodiment, and will be described with reference to FIG. 1. In the fourth embodiment, based on the relationship between the complexities of planes, recalculated code amount difference values are distributed to the planes.

The complexity is an index representing the difficulty of an image, as given by equation (1). Therefore, a code amount is generated more easily as a plane is more difficult, and the absolute amount of an integrated difference value becomes larger accordingly. In the fourth embodiment, a difference recalculator 118 distributes the recalculated code amount difference values to the planes using a complexity ratio between the planes in a subband of interest, which has been set by a subband complexity setting unit 116.

<Code Amount Control>

Figure 9:
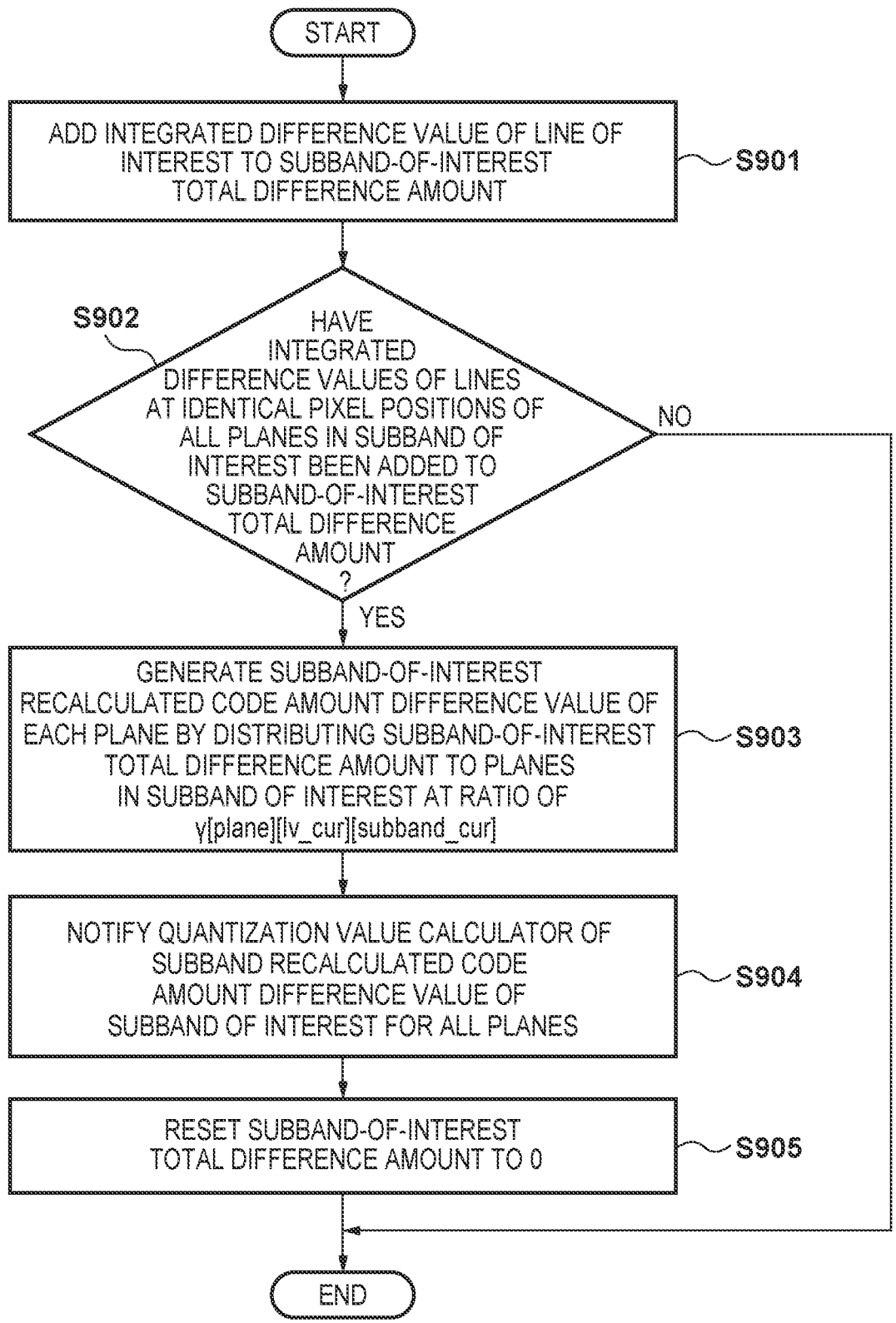
FIG. 9 is a flowchart illustrating the processing of a difference recalculator according to the fourth embodiment.

FIG. 9 is a flowchart illustrating the processing procedure of the difference recalculator 118 according to the fourth embodiment. The processing of the difference recalculator 118 according to the fourth embodiment will be described below with reference to FIG. 9. Note that FIG. 9 shows a case in which a plane conversion unit 101 uses RGB plane separation, and "plane" indicates one of R1, G1, G2, and B.

In step S901, the difference recalculator 118 adds the integrated difference value of a line of interest to a subband-of-interest total difference amount. In step S902, it is determined whether the integrated difference values of the lines at the identical pixel positions of all the planes in the subband of interest have been added to the subband-of-interest total difference amount. If it is determined that the integrated difference values have been added, the process advances to step S903; otherwise, the process ends.

In step S903, the difference recalculator 118 calculates the subband-of-interest recalculated code amount difference value of each plane from the subband-of-interest total difference amount based on the distribution ratio of the planes, that is,
γ[R][lv_cur][subband_cur]: γ[G1][lv_cur][subband_cur]: γ[G2][lv_cur][subband_cur]:γ[B][lv_cur][subband_cur].

Note that γ[plane][lv_cur][subband_cur] represents the ratio of Ere[plane][lv_cur][subband_cur] to be assigned to each plane. If the ratio of the complexity X[plane][lv_cur][subband_cur] of each plane in the subband of interest is used and the subband-of-interest total difference amount is positive, γ[R][lv_cur][subband_cur]: γ[G1][lv_cur][subband_cur]: γ[G2][lv_cur][subband_cur]:γ[B][lv_cur][subband_cur]=X[R][lv_cur][subband_cur]: X[G1][lv_cur][subband_cur]: X[G2][lv_cur][subband_cur]:X[B][lv_cur][subband_cur] is obtained.

If the subband-of-interest total difference amount is negative, γ[R][lv_cur][subband_cur]: γ[G1][lv_cur][subband_cur]: γ[G2][lv_cur][subband_cur]:γ[B][lv_cur][subband_cur]=1/X[R][lv_cur][subband_cur]: 1/X[G1][lv_cur][subband_cur]: 1/X[G2][lv_cur][subband_cur]: 1/X[B][lv_cur][subband_cur] is obtained.

In step S904, the difference recalculator 118 notifies a quantization value calculator 111 of the subband recalculated code amount difference value of the subband of interest for all the planes. In step S905, the difference recalculator 118 resets the subband-of-interest total difference amount to 0 in preparation for encoding of the next frame.

With the processing of FIG. 9, Ere[plane][lv_cur][subband_cur] is calculated by equation (14) below.

$$Esbtotal\ [\text{lv\_cur}]\ [\text{subband\_cur}][i-1] = \qquad (13)$$
$$\Sigma E[R]\ [\text{lv\_cur}]\ [\text{subband\_cur}][i-1] +$$
$$\Sigma E[G1]\ [\text{lv\_cur}]\ [\text{subband\_cur}][i-1] +$$
$$\Sigma E[G2]\ [\text{lv\_cur}]\ [\text{subband\_cur}][i-1] +$$
$$\Sigma E[B]\ [\text{lv\_cur}]\ [\text{subband\_cur}][i-1]$$

$$Ere\ [\text{plane}]\ [\text{lv\_cur}]\ [\text{subband\_cur}] = \qquad (14)$$
$$Esbtotal\ [\text{lv\_cur}]\ [\text{subband\_cur}]\ [i-1] \times$$
$$\gamma\ [\text{plane}]\ [\text{lv\_cur}]\ [\text{subband\_cur}]/\varepsilon$$

where ε represents a parameter for normalizing Ere[plane] [lv_cur][subband_cur] so that Esbtotal[lv_cur][subband_cur][i−1] is properly distributed, which is determined by each α[plane][lv_cur][subband_cur].

With the above processing, a larger recalculated code amount difference value to be used by the quantization value calculator 111 is distributed to a plane having a higher complexity using the ratio of the complexities of the planes.

A plane having a low complexity has a small generated code amount, and a coefficient value after performing DWT readily becomes 0 after quantization. In general, since the image quality extremely degrades when the coefficient value becomes 0, if even an easy image is quantized too much, degradation of the image quality becomes conspicuous. By assigning a recalculated code amount difference value in accordance with the complexity as in the fourth embodiment, the change amount of Qp of a plane having a low complexity with respect to initial Qp is smaller than that of Qp of a plane having a high complexity. This can suppress degradation of the image quality caused when the coefficient value becomes 0. As described above, code amount differences for the planes are summarized for each subband, and the code amount differences are redistributed at the ratio of the complexities, and quantization control is performed using the redistributed code amount differences, thereby making it possible to improve the image quality.

Fifth Embodiment

The fifth embodiment will be described below. An apparatus arrangement according to the fifth embodiment is the same as that shown in FIG. 1 of the first embodiment. The fifth embodiment is different from the first embodiment in that integrated difference values are summarized not for each subband but for each DWT decomposition level, and recalculated code amount difference values to be redistributed to the subbands of planes are calculated.

<Code Amount Control>

Subbands generated by DWT have different frequency bands depending on the decomposition level. Referring to FIG. 3, as the level number is smaller, a component has a higher frequency. Therefore, as the level is lower, Qp is desirably set larger. Furthermore, the predetermined Qp relationship between subbands in the same decomposition level is 1:1.

A difference recalculator 118 according to the fifth embodiment recalculates, as a recalculated code amount difference value, a code amount difference value to be used by a quantization value calculator so that the quantization parameters Qp of the planes have the predetermined Qp relationship and the quantization parameters Qp of the subbands also have the predetermined relationship.

Figure 10:
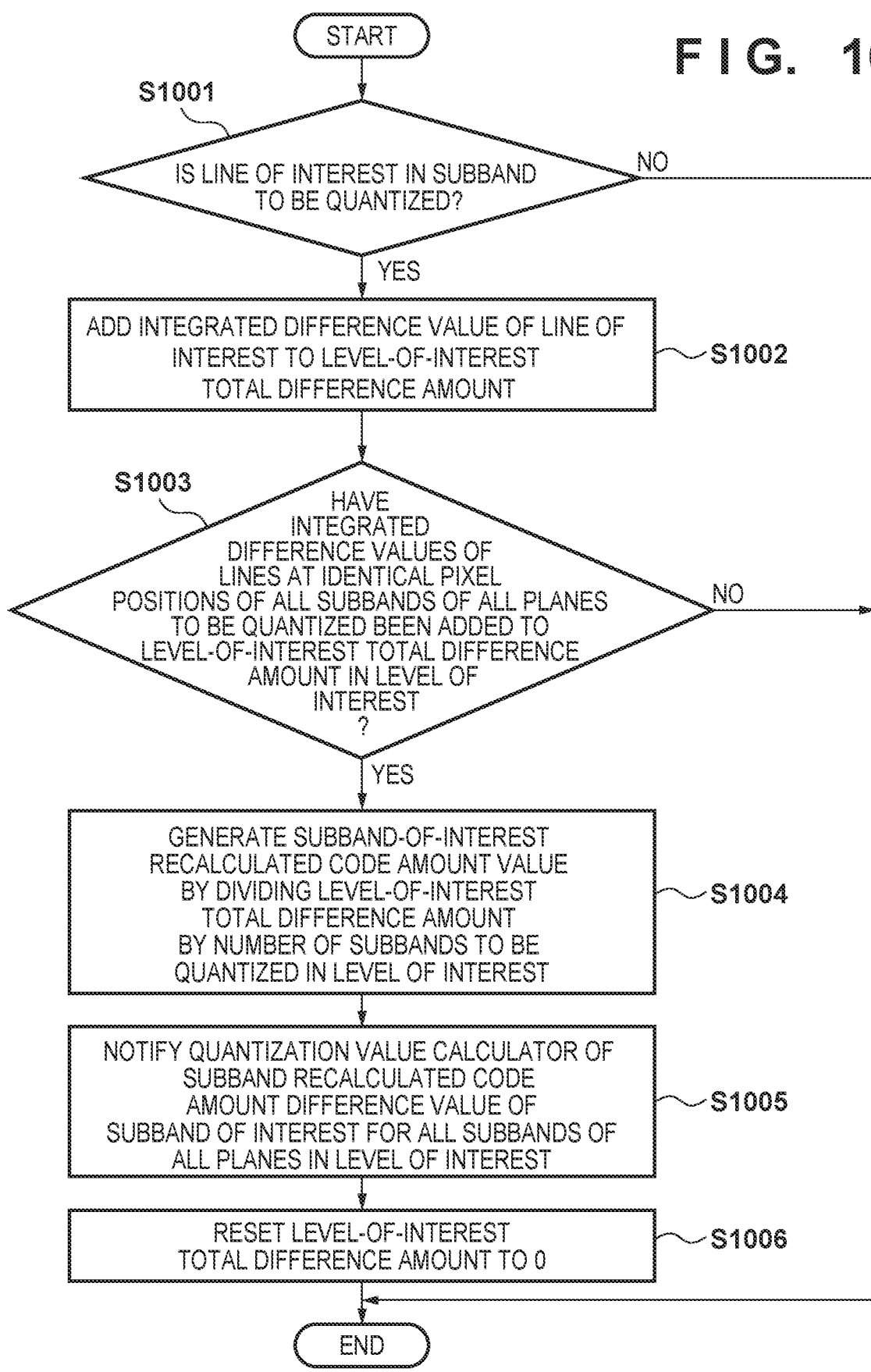
FIG. 10 is a flowchart illustrating the processing of a difference recalculator according to the fifth embodiment.

FIG. 10 is a flowchart illustrating the processing procedure of the difference recalculator 118 according to the fifth embodiment. The processing of the difference recalculator 118 according to the fifth embodiment will be described below with reference to FIG. 10. Note that FIG. 10 exemplifies a case in which a plane conversion unit 101 uses separation of RAW image data into R, G1, G2, and B planes. A level total difference amount Elvtotal[lv_cur][i−1] (to be described later) is a value generated by adding the integrated difference values of the subbands of the planes at a level of interest, and has a value of 0 as an initial value at start of encoding of a frame of interest.

In step S1001, the difference recalculator 118 determines whether a line of interest is in a subband to be quantized. If it is determined that the line of interest is in the subband, the process advances to step S1002; otherwise, the process ends. At the level of interest, a plane or subband not to be quantized may exist in terms of protection of the image quality. In the fifth embodiment, the integrated difference values of such subband are not summarized, and the integrated difference values of subbands to be quantized are only summarized, and recalculated code amount difference values are distributed to the subbands to be quantized.

In step S1002, the difference recalculator 118 adds the integrated difference value of the line of interest to a level-of-interest total difference amount. In step S1003, the difference recalculator 118 determines whether the integrated difference values of the lines at the identical pixel positions of all the subbands of all the planes to be quantized have been added to the level-of-interest total difference amount. If it is determined that the integrated difference values have been added, the process advances to step S1004; otherwise, the process ends.

In step S1004, the difference recalculator 118 calculates a subband-of-interest recalculated code amount value by dividing the level-of-interest total difference amount by the number of subbands (if all the subbands in the level of interest are to be quantized, the number of planes×3 (the number of subbands per plane)) to be quantized in the level of interest.

In step S1005, the difference recalculator 118 notifies a quantization value calculator 111 of the subband recalculated code amount difference value of the subband of interest for all the subbands of all the planes in the level of interest. In step S1006, the difference recalculator 118 resets the level-of-interest total difference amount to 0 in preparation for encoding of the next frame.

With the processing of FIG. 10, a recalculated code amount difference value Ere[plane][lv_cur][subband_cur] of each subband is calculated by equation (16) below. Note that all the subbands in the level of interest are to be quantized.

$$E\text{lvtotal}[\text{lv\_cur}][i-1] = \Sigma E[R][\text{lv\_cur}][HL][i-1] + \Sigma E[R]$$
$$[\text{lv\_cur}][LH][i-1] + \Sigma E[R][\text{lv\_cur}][HH][i-1] + \Sigma E$$
$$[G1][\text{lv\_cur}][HL][i-1] + \Sigma E[G1][\text{lv\_cur}][LH][i-$$
$$1] + \Sigma E[G1][\text{lv\_cur}][HH][i-1] + \Sigma E[G2][\text{lv\_cur}]$$
$$[HL][i-1] + \Sigma E[G2][\text{lv\_cur}][LH][i-1] + \Sigma E[G2]$$
$$[\text{lv\_cur}][HH][i-1] + \Sigma E[B][\text{lv\_cur}][HL][i-1] + \Sigma E$$
$$[B][\text{lv\_cur}][LH][i-1] + \Sigma E[B][\text{lv\_cur}][HH][i-1] \qquad (15)$$

$$Ere[\text{plane}][\text{lv\_cur}][\text{subband}] = E\text{lvtotal}[\text{lv\_cur}][i-1]/12 \qquad (16)$$

With the above processing, the recalculated code amount difference value to be used by the quantization value calculator 111 is common to all the subbands of all the planes in the level of interest.

In the first embodiment in which code amount differences are summarized for each subband, since the relationship between the quantization parameters Qp of the subbands cannot be adjusted, degradation of the image quality such that vertical line components blur may occur when, for example, Qp of the HL subband becomes large and Qp of the LH subband becomes small. To the contrary, in the fifth embodiment, since the relationship between the quantization parameters Qp of the subbands of the same level can be set to satisfy 1:1, that is, the predetermined Qp relationship, it is possible to avoid such degradation.

As described above, the code amount differences of all the subbands of all the planes are summarized at each decomposition level, and the differences are equally distributed to the subbands in the level. This can set the predetermined Qp relationship not only between the planes but also between the subbands of the same level, and it is possible to improve the image quality by performing quantization control using the redistributed code amount differences.

Sixth Embodiment

The sixth embodiment will be described below. An apparatus arrangement according to the sixth embodiment is the same as that shown in FIG. 1 of the first embodiment. The sixth embodiment is different from the first embodiment in that integrated difference values are summarized not for each subband but for all subbands to be quantized and recalculated code amounts to be redistributed to the subbands of planes are calculated.

<Code Amount Control>

As the relationship between quantization parameters Qp of the subbands, it is effective to set large Qp for coefficient data of a subband with a high spatial frequency to which a human is insensitive in terms of the human visual characteristic. As the relationship between the quantization parameters Qp of the subbands, therefore, among HL, LH, and HH subbands in the same decomposition level, Qp of HL subband=Qp of LH subband, and the HH subband has a higher frequency. From this viewpoint, Qp of the HH subband is desirably larger than Qp of the HL subband and LH subband of the same decomposition level. As described above, between the decomposition levels, Qp is desirably larger at a lower level. Furthermore, subbands of Lv3 indicate lower-frequency components, and are not quantized regardless of the type of image or the image target code amount in terms of the image quality.

As described above, by performing compression encoding in consideration of the ratio between the quantization parameters Qp of the subbands, it is possible to achieve the high image quality, as compared with a case in which code amount control is performed by equalizing Qp of the low frequency band and Qp of the high frequency band.

A difference recalculator 118 according to the sixth embodiment calculates recalculated code amount difference values to be used by a quantization value calculator 111 so that the quantization parameters Qp of the planes have the predetermined Qp relationship and the quantization parameters Qp not only in each level but also between all the subbands to be quantized also have the predetermined Qp relationship.

Figure 11:
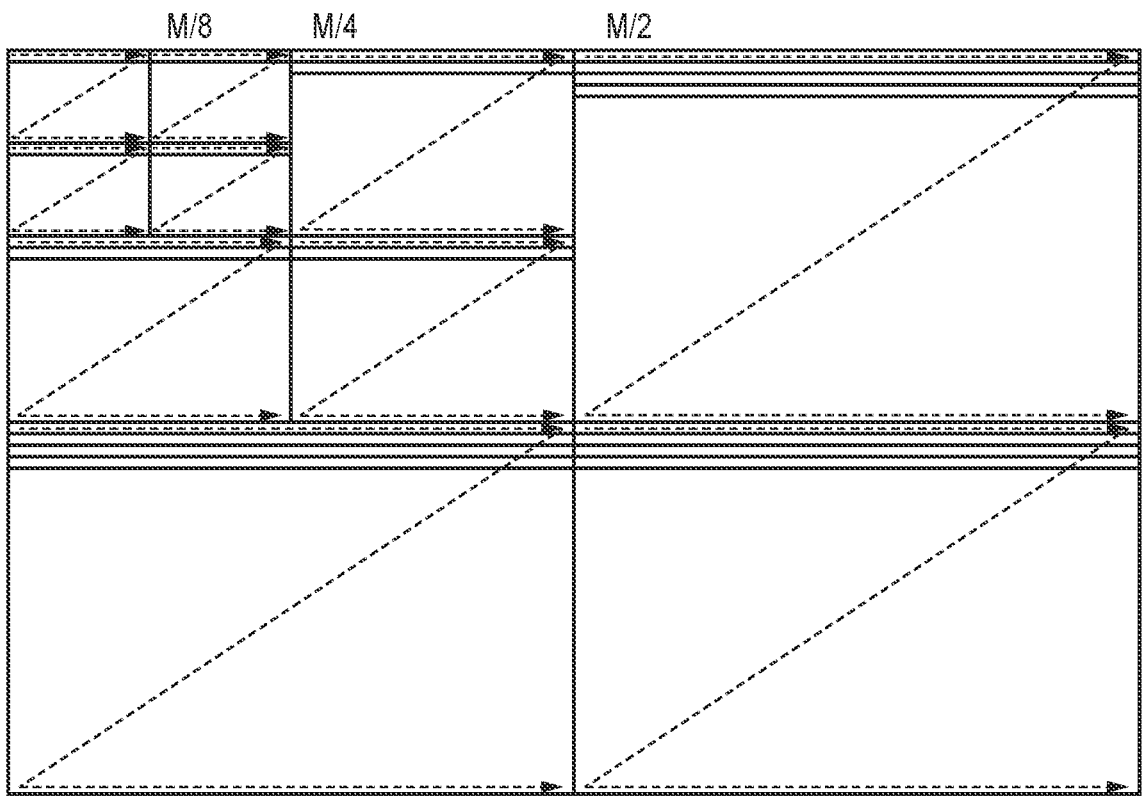
FIG. 11 is a view showing the positional relationship between identical pixels in subbands obtained by discrete wavelet transform according to the sixth embodiment.

FIG. 11 is a view showing the relationship between the identical pixel positions of the subbands with respect to an image before discrete wavelet transform (DWT) when each of vertical and horizontal filtering processes of discrete wavelet transform is executed three times.

In DWT, transform coefficients for one pixel line are generated for two pixel lines of an image before transform. Furthermore, since DWT is recursively performed for the LL subband, transform coefficients for one pixel line are generated at decomposition level 2 with respect to two pixel lines of decomposition level 1. Even if the decomposition level is increased, the same relationship is satisfied.

Based on the above relationship, with respect to M/2 lines of Lv1 as the highest frequency band, M/4 lines of Lv2 and M/8 lines of Lv3 are at the identical pixel positions. If the decomposition count of DWT is 3, the relationship between the smallest numbers of lines which are considered as lines at the identical pixel positions indicates that two lines of Lv2 or one line of Lv3 corresponds to four lines of Lv1, as shown in FIG. 11. Note that M is an integer.

In the sixth embodiment, quantization processing is performed for every four lines of Lv1, every two lines of Lv2, and each line of Lv3, in terms of setting of the relationship between the quantization parameters Qp at the identical pixel positions to the predetermined Qp relationship. Lines I at the identical pixel positions indicate I=4i in Lv1, I=2i in Lv2, and I=i in Lv3.

Figure 12:
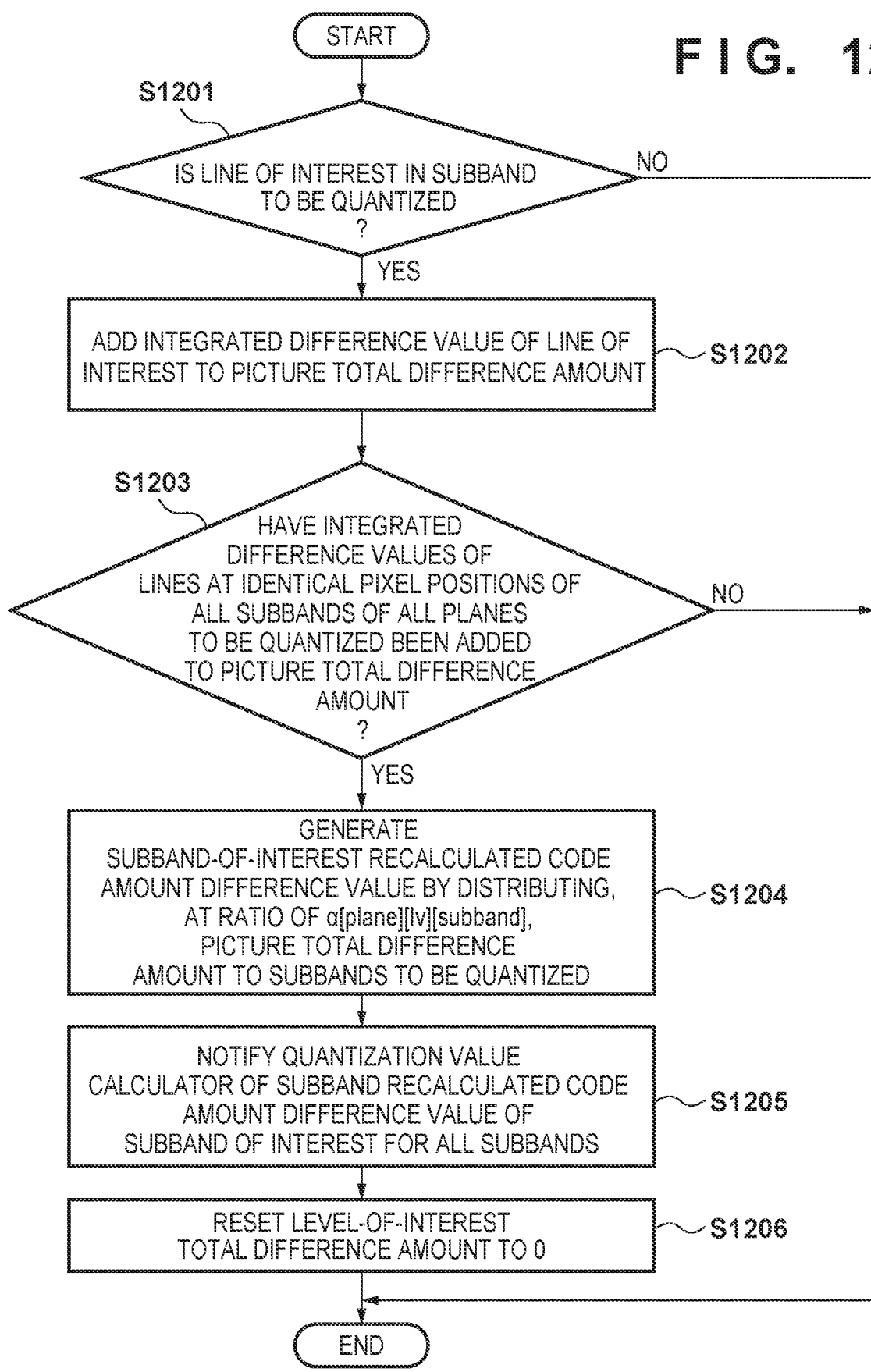
FIG. 12 is a flowchart illustrating the processing of a difference recalculator according to the sixth embodiment.

FIG. 12 is a flowchart illustrating the processing procedure of the difference recalculator 118 according to the sixth embodiment. The processing of the difference recalculator 118 according to the sixth embodiment will be described below with reference to FIG. 12. Note that in the sixth embodiment as well, a plane conversion unit 101 separates RAW image data into R, G1, G2, and B planes. A picture total difference amount Epictotal[I−1] (to be described later) is a value generated by adding integrated difference values ΣE[plane][lv][subband][I−1] of the subbands, and has a value of 0 as an initial value at start of encoding of an image of interest (a frame of interest).

In step S1201, the difference recalculator 118 determines whether a line of interest is in a subband to be quantized. If it is determined that the line of interest is in the subband, the process advances to step S1202; otherwise, the process ends.

In step S1202, the difference recalculator adds the integrated difference value of the line of interest to a picture-of-interest total difference amount. In step S1203, the difference recalculator 118 determines whether the integrated difference values of the lines at the identical pixel positions of all the subbands of all the planes to be quantized have been added to the picture total difference amount. If it is determined that the integrated difference values have been added, the process advances to step S1204; otherwise, the process ends.

In step S1204, the difference recalculator 118 generates a subband-of-interest recalculated code amount difference value by distributing, at the ratio of α[plane][lv][subband], the picture total difference amount to the subbands to be quantized. In the sixth embodiment, the relationship of α[plane][lv][subband] between the planes is given by α[R][lv][subband]=α[G1][lv][subband]=α[G2][lv][subband]=α[B][lv][subband].

Furthermore, between the levels, if the subband-of-interest total difference amount is positive, α[plane][lv+1][subband]<α[plane][lv][subband] holds. If the subband-of-interest total difference amount is negative, α[plane][lv+1][subband]>α[plane][lv][subband] holds.

Between the subbands, if the subband-of-interest total difference amount is positive, α[plane][lv][HL]=α[plane][lv][LH]<α[plane][lv][HH] holds. If the subband-of-interest total difference amount is negative, α[plane][lv][HL]=α[plane][lv][LH]>α[plane][lv][HH] holds.

In step S1205, the difference recalculator 118 notifies the quantization value calculator 111 of the subband recalculated code amount difference value of the subband of interest for all the subbands. In step S1206, the difference recalculator 118 resets the subband-of-interest total difference amount to 0 in preparation for encoding of the next frame.

With the processing of FIG. 12, a recalculated code amount difference value Ere[plane][lv][subband] of each subband is calculated by equation (18) below. Note that a subband not to be quantized is not included in integration of equation (17) below.

$$Epictotal[I-1]=\Sigma_{plane}^{plane\ count}\Sigma_{lv}^{lv\ count}\Sigma_{subband}^{subband\ count}E[plane][lv][subband][i-1] \quad (17)$$

$$Ere[plane][lv][subband]=Epoctotal[I-1]\times\alpha[plane][lv][subband]/\eta \quad (18)$$

where η represents a parameter for normalizing Ere[plane][lv][subband] so that Epictotal[I−1] is properly distributed, which is determined by each α[plane][lv][subband].

With the above processing, the recalculated code amount difference values to be used by the quantization value calculator 111 are distributed, at the predetermined Qp ratio, to all the subbands of all the planes to be quantized.

By adapting the sixth embodiment, it is possible to perform quantization control while keeping an arbitrary Qp relationship not only in the same level but also between all the subbands in addition to the planes. The above processing can summarize the code amount differences of all the subbands of all the planes to be quantized and set the predetermined Qp relationship between all the subbands, and it is possible to improve the image quality by performing quantization control using the redistributed code amount differences.

Note that the number of planes is not limited. For example, a case in which an input image is set as one plane and DWT is performed for the one plane is also incorporated in the sixth embodiment.

Similarly, the present invention is not limited to a case in which subbands of Lv3 are not quantized based on the predetermined Qp relationship. For example, a case in which at DWT decomposition level 3, only the LL subband is not quantized is also incorporated in this embodiment. Furthermore, a case in which the code amount differences of all the subbands of all the planes are summarized and are redistributed to the subbands using the ratio of complexities described in the fourth embodiment is incorporated in this embodiment.

The embodiments have been described in detail above. The present invention, however, is not limited to these specific embodiments, and various changes and modifications can be made without departing from the scope of the present invention. All or some of the components of the above-described embodiments can be combined.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-110223, filed Jun. 1, 2016, which is hereby incorporated by reference herein in its entirety.

What is claimed is:

1. An image encoding apparatus for encoding moving image data captured by an image capturing unit, the apparatus comprising:
   a central processing unit (CPU); and
   a memory storing a program to be executed by the CPU, wherein, when read and executed by the CPU, the program causes the image encoding apparatus to function as units comprising:
   (1) a plane conversion unit configured to generate, from RAW image data of one frame of the moving image data, data of a plurality of planes each formed from a single component, wherein pixels in the RAW image data are arrayed in a Bayer pattern;
   (2) a frequency conversion unit configured to generate, for each plane, coefficient data of a plurality of subbands by performing frequency conversion for the data of a plane of interest;
   (3) a quantization unit configured to quantize, for each plane, the coefficient data included in a block having a predetermined size with a subband, using a quantization parameter for the block of a plane of interest;
   (4) an encoder configured to generate, for each plane, encoded data by encoding the quantized coefficient data of the block of a plane of interest; and
   (5) a control unit configured to update, for each plane, the quantization parameter to be used by the quantization unit so that a code amount of the encoded data generated by the encoder becomes equal to a target code amount set for a plane of interest,
   wherein, when the blocks of interest of the plurality of planes are encoded, the control unit
   (a) calculates a total code amount difference by summing plane code amount differences of the plurality of planes, where each of the plane code amount differences is, in one plane of the plurality of planes, an integrated difference between a code amount of the encoded data from a first block to a block immediately before the block of interest and a target amount from the first block to the block immediately before the block of interest of the one plane,
   (b) distributes the total code amount difference, as distribution values, to the plurality of planes, where the distribution values are calculated by dividing the total code amount difference in accordance with predetermined distribution ratios defined for the plurality of planes, and (c) updates, for each plane, the quantization parameter of the block of interest by adding a value corresponding to the distribution value to the quantization parameter.

2. The apparatus according to claim 1, wherein the plane conversion unit generates plane data of R, G1, G2, and B of a Bayer arrangement from the RAW image data,
wherein the control unit updates the quantization parameter for each plane by dividing the total code amount difference by 4, and
wherein quantization parameters of initial blocks of the plurality of planes are the same.

3. The apparatus according to claim 1, wherein the plane conversion unit generates a luminance plane and a plurality of color-difference planes from the RAW image data, and
wherein in the predetermined distribution ratios, a ratio for the luminance plane is least among the plurality of planes.

4. The apparatus according to claim 1, wherein the plane conversion unit generates a luminance plane and a plurality of color-difference planes from the RAW image data, and
wherein the control unit (a) distributes the distribution values to the plurality of color-difference planes, except for the luminance plane, and (b) updates, for each color-difference plane, the quantization parameter based on the distribution value.

5. The apparatus according to claim 1, wherein the frequency conversion unit performs discrete wavelet transform, and
wherein the control unit updates, for each plane, the quantization parameter in accordance with a decomposition level of subbands obtained by the frequency conversion unit.

6. The apparatus according to claim 5, wherein the quantization parameter is larger as the decomposition level is lower.

7. The apparatus according to claim 6, wherein among an HL subband, an LH subband, and an HH subband in the same decomposition level, the quantization parameter of the HH subband is larger than the quantization parameters of the HL subband and the LH subband.

8. A control method for an image encoding apparatus for encoding moving image data captured by an image capturing unit, the method comprising:
generating, from RAW image data of one frame of the moving image data, data of a plurality of planes each formed from a single component, wherein pixels in the RAW image data are arrayed in a Bayer pattern;
generating, for each plane, coefficient data of a plurality of subbands by performing frequency conversion for the data of a plane of interest;
quantizing, for each plane, the coefficient data included in a block having a predetermined size with a subband using a quantization parameter for the block of a plane of interest;
generating, for each plane, encoded data by encoding the quantized coefficient data of the block of a plane of interest; and
updating, for each plane, the quantization parameter used in the quantizing so that a code amount of the generated encoded data becomes equal to a target code amount set for a plane of interest,
wherein when the blocks of interest of the plurality of planes are encoded, the quantization parameter is updated in the updating by performing steps comprising
(a) calculating a total code amount difference by summing plane code amount differences of the plurality of planes, where each of the plane code amount differences is, in one plane of the plurality of planes, an integrated difference between a code amount of the encoded data from a first block to a block immediately before the block of interest and a target amount from the first block to the block immediately before the block of interest of the one plane,
(b) distributing the total code amount difference, as distribution values, to the plurality of planes, where the distribution values are calculated by dividing the total code amount difference in accordance with predetermined distribution ratios defined for the plurality of planes, and
(c) updating, for each plane, the quantization parameter of the block of interest by adding a value corresponding to the distribution value to the quantization parameter.

9. A non-transitory computer-readable storage medium storing a program which, when read and executed by a computer, causes the computer to execute:
generating, from RAW image data of one frame of moving image data, data of a plurality of planes each formed from a single component, wherein pixels in the RAW image data are arrayed in a Bayer pattern;
generating, for each plane, coefficient data of a plurality of subbands by performing frequency conversion for the data of a plane of interest;
quantizing, for each plane, the coefficient data included in a block having a predetermined size with a subband, using a quantization parameter for the block of a plane of interest;
generating, for each plane, encoded data by encoding the quantized coefficient data of the block of a plane of interest; and
updating, for each plane, the quantization parameter used in the quantizing so that a code amount of the generated encoded data becomes equal to a target code amount set for a plane of interest,
wherein when the blocks of interest of the plurality of planes are encoded, the quantization parameter is updated in the updating by performing steps comprising
(a) calculating a total code amount difference by summing plane code amount differences of the plurality of planes, where each of the plane code amount differences is, in one plane of the plurality of planes, an integrated difference between a code amount of the encoded data from a first block to a block immediately before the block of interest and a target amount from the first block to the block immediately before the block of interest of the one plane,
(b) distributing the total code amount difference, as distribution values, to the plurality of planes, where the distribution values are calculated by dividing the total code amount difference in accordance with predetermined distribution ratios defined for the plurality of planes, and
(c) updating, for each plane, the quantization parameter of the block of interest by adding a value corresponding to the distribution value to the quantization parameter.

* * * * *